(12) United States Patent
Houston

(10) Patent No.: US 8,099,265 B2
(45) Date of Patent: Jan. 17, 2012

(54) FAST CHARACTERIZATION OF FLUID DYNAMICS

(75) Inventor: Benjamin Barrie Houston, Ottawa (CA)

(73) Assignee: Exocortex Technologies, Inc., Ottawa, Ontrario (CA)

( * ) Notice: Subject to any disclaimer, the term of this patent is extended or adjusted under 35 U.S.C. 154(b) by 530 days.

(21) Appl. No.: 12/346,899

(22) Filed: Dec. 31, 2008

(65) Prior Publication Data
US 2009/0171596 A1 Jul. 2, 2009

Related U.S. Application Data

(60) Provisional application No. 61/009,440, filed on Dec. 31, 2007.

(51) Int. Cl.
G06G 7/50 (2006.01)
G06F 17/17 (2006.01)
G01M 9/00 (2006.01)
G06T 17/00 (2006.01)
G06T 15/10 (2011.01)

(52) U.S. Cl. ........ 703/9; 703/2; 345/420; 345/424; 345/427; 73/147

(58) Field of Classification Search .......... 703/9, 2; 345/420, 424, 427; 73/147
See application file for complete search history.

(56) References Cited

U.S. PATENT DOCUMENTS

| | | | | |
|---|---|---|---|---|
| 4,809,202 A | * | 2/1989 | Wolfram | 703/9 |
| 5,377,129 A | * | 12/1994 | Molvig et al. | 703/9 |
| 5,544,524 A | * | 8/1996 | Huyer et al. | 73/147 |
| 5,732,192 A | * | 3/1998 | Malin et al. | 703/2 |
| 5,953,239 A | * | 9/1999 | Teixeira et al. | 703/6 |
| 6,089,744 A | * | 7/2000 | Chen et al. | 703/2 |
| 6,263,300 B1 | * | 7/2001 | Strumolo et al. | 703/8 |
| 6,266,071 B1 | * | 7/2001 | Stam et al. | 345/473 |
| 6,516,292 B2 | * | 2/2003 | Yahalom | 703/9 |
| 6,941,249 B1 | * | 9/2005 | Miller et al. | 703/1 |
| 7,130,782 B2 | * | 10/2006 | Miyori et al. | 703/9 |
| 7,243,057 B2 | * | 7/2007 | Houston et al. | 703/9 |
| 7,558,714 B2 | * | 7/2009 | Shan et al. | 703/9 |
| 7,565,276 B2 | * | 7/2009 | Song et al. | 703/2 |
| 7,580,821 B2 | * | 8/2009 | Schirm et al. | 703/9 |
| 7,651,598 B2 | * | 1/2010 | Shapiro et al. | 204/450 |

(Continued)

OTHER PUBLICATIONS

A Unified Approach for Modeling Complex Occlusions in Fluid Simulations; Ben Houston et al ; p. 1; 2003.*

(Continued)

Primary Examiner — Kamini S Shah
Assistant Examiner — Akash Saxena
(74) Attorney, Agent, or Firm — Victoria Donnelly IP-MEX Inc.

(57) ABSTRACT

Methods and apparatus for fast computation of fluid velocity fields in the presence of objects causing flow discontinuity are disclosed. Rigorous evaluation of perturbed velocity fields, each resulting from placing an object in a bounded space sustaining a reference velocity field, are determined for different orientations of the object with respect to a reference velocity field and different values of the magnitude of the velocity field. A velocity field is determined at selected sampling points within an enclosure surrounding the object. Pre-computed perturbed velocity fields determined for each object of a set of reference objects are stored in a computer memory. Fast real-time computation of velocity-field perturbations caused by presence of objects at arbitrary positions in a space sustaining velocity fields of different magnitudes and directions are realized using the stored pre-computed data.

17 Claims, 32 Drawing Sheets

U.S. PATENT DOCUMENTS

| | | | |
|---|---|---|---|
| 7,668,705 B2* | 2/2010 | Kalitzin et al. | 703/2 |
| 7,765,090 B2* | 7/2010 | Nakayama et al. | 703/9 |
| 7,813,907 B2* | 10/2010 | Zhang et al. | 703/9 |
| 2002/0147573 A1* | 10/2002 | Miyori | 703/9 |
| 2003/0060988 A1* | 3/2003 | Ginzburg | 702/50 |
| 2003/0130829 A1* | 7/2003 | Hamamoto et al. | 703/11 |
| 2004/0195439 A1* | 10/2004 | Hamamoto et al. | 244/72 |
| 2005/0240384 A1* | 10/2005 | Houston et al. | 703/9 |
| 2007/0043544 A1* | 2/2007 | Song et al. | 703/9 |
| 2007/0239414 A1* | 10/2007 | Song et al. | 703/9 |
| 2007/0294066 A1* | 12/2007 | Nakayama et al. | 703/9 |
| 2008/0126045 A1* | 5/2008 | Shan et al. | 703/9 |
| 2008/0177511 A1* | 7/2008 | Kamatsuchi | 703/1 |
| 2008/0269611 A1* | 10/2008 | Pedrizzetti et al. | 600/454 |
| 2008/0294402 A1* | 11/2008 | Moroni | 703/9 |
| 2009/0012931 A1* | 1/2009 | Appa et al. | 707/2 |
| 2009/0234595 A1* | 9/2009 | Okcay et al. | 702/49 |
| 2010/0045669 A1* | 2/2010 | Johnson | 345/420 |
| 2010/0070249 A1* | 3/2010 | Ionasec et al. | 703/2 |
| 2010/0088081 A1* | 4/2010 | Shan et al. | 703/9 |
| 2010/0185420 A1* | 7/2010 | Ding | 703/2 |
| 2010/0256957 A1* | 10/2010 | Slavik | 703/2 |
| 2010/0277475 A1* | 11/2010 | Mcadams et al. | 345/420 |
| 2010/0280799 A1* | 11/2010 | Gu et al. | 703/2 |
| 2010/0286968 A1* | 11/2010 | Parashkevov | 703/2 |
| 2011/0040529 A1* | 2/2011 | Hamann et al. | 703/1 |
| 2011/0040535 A1* | 2/2011 | Sato | 703/2 |
| 2011/0112800 A1* | 5/2011 | Kim et al. | 703/1 |

OTHER PUBLICATIONS

Treuille, A. et al. "Model Reduction for Real-time Fluids", ACM Transactions on Graphics 25(3), 826-834, SIGGRAPH 2006.

James, D.L. et al. "Precomputing Interactive Dynamic Deformable Scenes", ACM Transactions on Graphics 22, 3 (July), pp. 879-887, 2003.

Bridson, R. et al. "Curl-Noise for Procedural Fluid Flow", International Conference on Computer Graphics and Interactive Techniques, ISSN: 0730-0301, 2007.

Perlin, K. "An Image Synthesizer", Proceedings of the ACM SIGGRAPH vol. 19, No. 3, pp. 287-296, 1985.

Patel, M. et al. "Simple Divergence-Free Fields for Artistic Simulation", Journal of graphics tools vol. 10, No. 4, Dec. 2005.

Feldman et al. "Animating Suspended Particle Explosions", Proceedings of the ACM SIGGRAPH, San Diego, California, pp. 708-715, Jul. 27-31,2003.

Feldman, B. et al. "Animating Gases with Hybrid Meshes", Proceedings of the ACM SIGGRAPH, Los Angeles, p. 904-909, California, Aug. 1-4, 2005.

Selle et al. "A Vortex Particle Method for Smoke, Water and Explosions", ACM Transactions on Graphics (TOG), vol. 24, issue 3, pp. 910-914, 2005.

Si, Hang "TetGen A Quality Tetrahedral Mesh Generator and Three-Dimensional Delaunay Triangulator", Weierstrass Institute for Applied Analysis and Stochastics, Berlin, Germany, Apr. 2007.

Labelle, F. and Shewchuk, J. R. 2007. "Isosurface stuffing: fast tetrahedral meshes with good dihedral angles" ACM Trans. Graph. 26, 3, p. 57, Jul. 2007.

Klingner, B.M., Feldman, B.E., Chentanez, N., O'Brien, J.F., "Fluid Animation with Dynamic Meshes" in The Proceedings of ACM SIGGRAPH Boston, Massachusetts, p. 820-825, Jul. 30-Aug. 3, 2006.

* cited by examiner

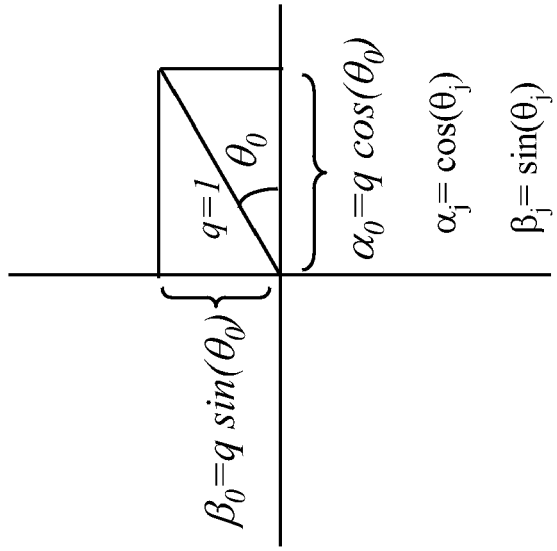

Linear interpolation $$\phi_j = f(v_j, v_{j+1}, \theta_j) = v_j + (2\,\theta_j/\pi) \times (v_j - v_{j+1})$$

Non-Linear interpolation

Interpolated velocity $$\lambda_j = (\alpha_j\, v_j + \beta_j\, v_{j+1})$$

Limiting velocity magnitude $$\mu_j = \max\{|v_j|, |v_{j+1}|\}, \quad 0 \le j < 4, \quad v_4 \equiv v_0$$

Velocity corresponding to unit vector $\{\alpha_j, \beta_j\}$, $0 \le j < 4$:

$$\phi_j = \begin{cases} \lambda_j\,(\mu_j/|\lambda_j|) & \text{if } |\lambda_j| > \mu_j > 0 \\ \lambda_j & \text{otherwise} \end{cases}$$

*FIG. 9*

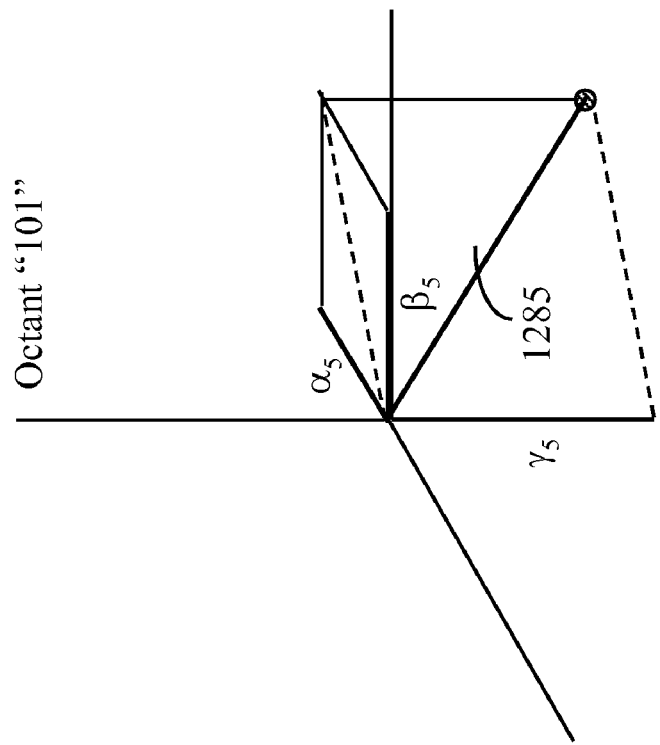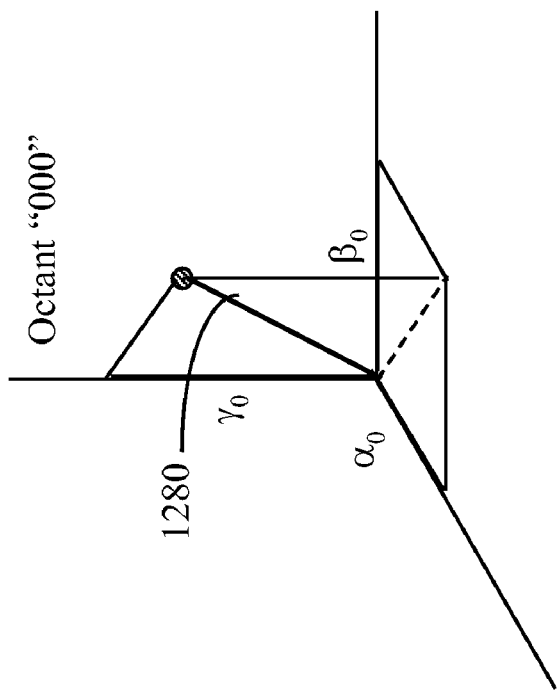
FIG. 13

Interpolated incremental velocity $$\lambda_0 = \alpha_0 v^+_{s,x} + \beta_0 v^+_{s,y} + \gamma_0 v^+_{s,z}$$
$$\lambda_1 = \alpha_1 v^-_{s,x} + \beta_1 v^+_{s,y} + \gamma_1 v^+_{s,z}$$
$$\lambda_2 = \alpha_2 v^+_{s,x} + \beta_2 v^-_{s,y} + \gamma_2 v^+_{s,z}$$
$$\lambda_3 = \alpha_3 v^-_{s,x} + \beta_3 v^-_{s,y} + \gamma_3 v^+_{s,z}$$
$$\lambda_4 = \alpha_4 v^+_{s,x} + \beta_4 v^+_{s,y} + \gamma_4 v^-_{s,z}$$
$$\lambda_5 = \alpha_5 v^-_{s,x} + \beta_5 v^+_{s,y} + \gamma_5 v^-_{s,z}$$
$$\lambda_6 = \alpha_6 v^+_{s,x} + \beta_6 v^-_{s,y} + \gamma_6 v^-_{s,z}$$
$$\lambda_7 = \alpha_7 v^-_{s,x} + \beta_7 v^-_{s,y} + \gamma_7 v^-_{s,z}$$

Limiting incremental-velocity magnitude $$\mu_0 = \max\{|v^+_{s,x}|, |v^+_{s,y}|, |v^+_{s,z}|\}$$
$$\mu_1 = \max\{|v^-_{s,x}|, |v^+_{s,y}|, |v^+_{s,z}|\}$$
$$\mu_2 = \max\{|v^+_{s,x}|, |v^-_{s,y}|, |v^+_{s,z}|\}$$
$$\mu_3 = \max\{|v^-_{s,x}|, |v^-_{s,y}|, |v^+_{s,z}|\}$$
$$\mu_4 = \max\{|v^+_{s,x}|, |v^+_{s,y}|, |v^-_{s,z}|\}$$
$$\mu_5 = \max\{|v^-_{s,x}|, |v^+_{s,y}|, |v^-_{s,z}|\}$$
$$\mu_6 = \max\{|v^+_{s,x}|, |v^-_{s,y}|, |v^-_{s,z}|\}$$
$$\mu_7 = \max\{|v^-_{s,x}|, |v^-_{s,y}|, |v^-_{s,z}|\}$$

Velocity corresponding to unit vector $\{\alpha j, \beta j, \gamma j\}$, $0 \leq j < 8$:

$$\phi_j = \begin{cases} \lambda_j \left(\mu_j/|\lambda_j|\right) & \text{if } |\lambda_j| > \mu_j > 0 \\ \lambda_j & \text{otherwise} \end{cases}$$

*FIG. 14*

| Speed: S meters/sec | Log₂(S) | Direction | | | | | |
|---|---|---|---|---|---|---|---|
| | | $v^+_{s,x}$ | $v^+_{s,y}$ | $v^+_{s,z}$ | $v^-_{s,x}$ | $v^-_{s,y}$ | $v^-_{s,z}$ |

| 8.0 | 3.0 | $v^+_{8,x}$ ↘ | | $v^+_{8,z}$ ← | | $v^-_{8,y}$ ↘ | |
| 11.0 | 3.4594 | $v^+_{11,x}$ ↘ | | $v^+_{11,z}$ ← | | $v^-_{11,y}$ ↘ | |
| 16.0 | 4.0 | $v^+_{16,x}$ ↘ | | $v^+_{16,z}$ ← | | $v^-_{16,y}$ ↘ | |

FAST CHARACTERIZATION OF FLUID DYNAMICS

CROSS REFERENCE TO RELATED APPLICATIONS

The present application claims the benefit of U.S. provisional application Ser. No. 61/009,440 filed Dec. 31, 2007 to Houston et al., entitled "Methods of Modelling Fluid Flow", the contents of which are incorporated herein by reference.

FIELD OF THE INVENTION

The present invention relates to characterization of fluid dynamics in a partially bounded space subjected to a forced fluid stream.

BACKGROUND OF THE INVENTION

Real-time fluid modeling in video games, training and interactive media is an area of great interest. One important part of fluid modeling involves providing a real-time fluid system for computer graphics applications to model air flow, dust, leaves, texture sprites, volumetric smoke densities, magical effects and explosions, for example. Fluid simulations are very computationally extensive and thus have so far proved to be impractical for real-time computer graphics applications.

Modern online simulations used for visual effects use a real-time computational environment. Conventional applications in video games apply animated textures to objects in a scene.

Treuille, A. et al. "Model Reduction for Real-time Fluids", ACM 0730-0301/06/0700-0826: 826-834 (Treuille) use an accurate off-line solver to produce a set of high-resolution fluid simulations representative of expected object behavior. The velocity fields are computed using a full-dimensional fluid simulation model. A set of forces is determined at the surface of an object to move the object in space and time. The principal components analysis method of James, D. L. et al. "Precomputing Interactive Dynamic Deformable Scenes", ACM Transactions on Graphics 22, 3 (July), pages 879-887 (James) is used to reduce the dimensionality of both global velocity fields and object-specific velocity fields. Acceptable runtime speeds of 30 to 588 frames per second are achieved in four examples disclosed in the Treuille et al. reference. The speed comes at the cost of accuracy, generality, and increased memory requirements. For instance, rendering a model with 256×64×128 Voxels requires in excess of 256 MB of buffer memory in a graphics card. Such a requirement makes it impossible to implement the method of Treuille et al. in a video game engine such as an XBOX or Sony's PS3 (PlayStation 3).

Bridson, R. et al. "Curl-Noise for Procedural Fluid Flow", International Conference on Computer Graphics and Interactive techniques, 2007, ISSN: 0730-0301 (Bridson) discloses a method in which the curl of Perlin noise as disclosed in Perlin, K. "An Image Synthesizer", Proceedings of the ACM SIGGRAPH 1985, pages 287-296 is used to make a procedural fluid flow algorithm that can be rapidly queried any place in a modeled space that does not penetrate object boundaries. In the Bridson reference the method disclosed by Patel, M. et al. "Simple Divergence-Free Fields for Artistic Simulation", Journal of graphics tools Vol. 10, No. 4, pages 49-60 is extended to handle arbitrary solid boundaries and to avoid periodic dead spots where the fluid velocity becomes zero. To maintain the incompressibility property of low-speed fluid flow, a vector curl of a three-dimensional potential field $\vec{\psi}=(\psi_x, \psi_y, \psi_z)$ is computed. The curl of this vector field $\nabla \times \vec{\psi}$ gives a velocity field $$\vec{v}(x, y, z) = \left( \frac{\partial \psi_z}{\partial y} - \frac{\partial \psi_y}{\partial z}, \frac{\partial \psi_x}{\partial z} - \frac{\partial \psi_z}{\partial x}, \frac{\partial \psi_y}{\partial x} - \frac{\partial \psi_x}{\partial y} \right).$$

Their basic potential is simply three uncorrelated noise functions, each of which is determined using Perlin noise. To model realistic turbulence, several octaves of Perlin noise are combined with the amplitude of noise decreasing for higher octaves. This results in smaller-scale vortices having smaller wind speeds than those of the larger vortices. Penetration of fluid in modeled objects is avoided by ramping down the velocity flow normal to the surfaces of modeled objects. However, this approach requires significant user tuning in the modeled space to provide corrections in the velocity field downstream of embedded objects. These required adjustments render this method unsuitable for use in a real-time simulation environment.

In the movie industry, non-real-time simulations have been used to provide very realistic effects. Feldman et al. "Animating Suspended Particle Explosions", Proceedings of the ACM SIGGRAPH, 2003, pages 708-715 disclose a method for animating suspended particle explosions. A stable incompressible fluid model is used to model the motion of air and hot gases. A divergence field of the fluid is adjusted directly to model detonations and the expansion of combustion products. The motion of particulate fuel and soot is tracked by advecting particles embedded in the fluid using a velocity field. Their model uses roughly 6 seconds of computing time and 56 seconds of rendering time per frame displayed. This is a factor of 200 to 2000 times too slow for real-time applications.

Feldman, B. et al. "Animating Gases with Hybrid Meshes", Proceedings of the ACM SIGGRAPH 2005 disclose a method of hybridizing standard hexahedral meshes with tetrahedral meshes to animate gases. This hybrid method offers accuracy near obstacles and efficiency in open regions in a uniform manner. They use semi-Langrangian integration of the fluid equations to track fluid motion in modeled spaces. At high resolution, this method can produce visually excellent results, using perhaps 120,000 tetrahedra and hexahedra to provide a mesh for modeling a scene. An optimization is performed for fast evaluation using a known technique, where a least-squares interpolation is performed to estimate velocities at all vertices of the tetrahedral and hybrid portions of the mesh. However, this method requires integrating the equations of motion directly, which results in a model that is unsuitable for real-time modeling and takes on the order of 20 seconds of computing time to render each frame. This is on the order of 600 times too slow for on-line simulation purposes.

Selle et al. "A Vortex Particle Method for Smoke, Water and Explosions", ACM Transactions on Graphics (TOG), 2005, Volume 24, issue 3, pages 910-914 discloses a vortex particle method in which a hybrid technique that makes synergistic use of Lagrangian vortex particles and Eulerian grid methods is used to model highly turbulent effects such as explosions and rough water. Vorticity confinement is used to model vorticity of fluids. In particular, a number of discrete elements of vorticity are introduced into a fluid to model eddies in the air and water. Similar to the method disclosed in the Bridson reference, the curl of the fluid field is used. However, instead of advecting units of fluid around the modeled space, units of vorticity are advected through space. A kernel function is used to define each unit of vorticity in the space, where the local vorticity magnitude goes from zero to one and back using a three-dimensional tent function near each vortex particle. The net vorticity at a point is the sum of contributions from all nearby particles. Such a field is differentiated to get a velocity field, which is then used to advect the vortex particles. However, this technique is too computationally intensive to be used in real-time applications.

SUMMARY OF THE INVENTION

The present invention provides methods and apparatus for fast computation of fluid velocity fields in the presence of objects causing flow discontinuity for real-time applications.

In accordance with one aspect, the invention provides a method for determining and displaying fluid flow in a bounded space. The method comprises a step of defining a set of reference velocity fields, oriented in specified directions, sustained within the bounded space.

A set of incremental velocity fields of the reference velocity fields, caused by placing an object within the bounded space, are determined for different predefined speed values for subsequent use in real-time evaluation of velocity perturbation caused by placing the object in an arbitrary position, with an arbitrary orientation, in a velocity field which may differ from each of the reference velocity fields. The predefined speed values preferably follow a geometric series.

In a real-time application, a specified velocity field is induced within the bounded space. Perturbation of the specified velocity field, caused by placing the object at a specific position within the bounded space, is determined by performing an interpolation process based on the reference velocity fields, the set of incremental velocity fields, and a representative velocity vector of the specified velocity field at the specific position. The specified velocity field and its perturbation are presented to a display module for visual examination by a user.

Each incremental velocity field is preferably represented by incremental velocity vectors at selected sampling points within the bounded space. The incremental velocity vectors may be determined at all sampling points but only incremental velocity vectors each having a magnitude exceeding a predefined threshold may be retained for subsequent real-time interpolation processes. Alternatively, the incremental velocity vectors may be determined only at sampling points within an enclosure surrounding the object. The enclosure is selected so that each incremental velocity field outside the enclosure is estimated to have a negligible magnitude. A preferred form of the enclosure is an ellipsoid.

The specified directions of the set of reference velocity fields are selected to be along mutually orthogonal axes referenced as an x-axis, a y-axis, and a z-axis.

For each speed value S (expressed in meters per second for example) of the predefined speed values, corresponding incremental velocity vectors $v^+_{s,x}$, $v^+_{s,y}$, $v^+_{s,z}$, $v^-_{s,x}$, $v^-_{s,y}$, and $v^-_{s,z}$ are determined. The incremental velocity vectors $v^+_{s,x}$, $v^+_{s,y}$, $v^+_{s,z}$, $v^-_{s,x}$, $v^-_{s,y}$, and $v^-_{s,z}$ correspond to reference velocity fields along a positive direction of the x-axis, positive direction of the y-axis, positive direction of the z-axis, negative direction of the x-axis, negative direction of the y-axis, and the negative direction of the z-axis, respectively. The incremental velocity vectors, for each of the predefined speed values, are stored in a computer readable medium for future real-time use.

Incremental velocity vectors $v^+_{h,x}$, $v^+_{h,y}$, $v^+_{h,z}$, $v^-_{h,x}$, $v^-_{h,y}$, and $v^-_{h,z}$, corresponding to a speed value h (in meters per second, for example) not included in the predefined speed values but within the range of the predefined speed values so that $p<h<q$, p and q denoting speed values included in the predefined speed values, are determined according to one of many options of interpolation approximations. In a preferred interpolation: $v^+_{h,x} = (1-\delta)v^+_{p,x} + \delta v^+_{q,x}$; $v^+_{h,y} = (1-\delta)v^+_{p,y} + \delta v^+_{q,y}$; $v^+_{h,x} = (1-\delta)v^+_{p,z} + \delta v^+_{q,z}$; $v^-_{h,x} = (1-\delta)v^-_{p,x} + \delta v^-_{q,x}$; $v^-_{h,x} = (1-\delta)v^-_{p,y} + \delta v^-_{q,y}$; and $v^-_{h,x} = (1-\delta)v^-_{p,z} + \delta v^-_{q,z}$;

where $\delta = (\log h - \log p)/(\log q - \log p)$, the term log denoting logarithm of a finite number for any finite base. Incremental velocity vectors $v^+_{p,x}$, $v^+_{p,y}$, $v^+_{p,z}$, $v^-_{p,x}$, $v^-_{p,y}$, and $v^-_{p,z}$, correspond to a speed value p, and incremental velocity vectors $v^+_{q,x}$, $v^+_{q,y}$, $v^+_{q,z}$, $v^-_{q,x}$, $v^-_{q,y}$, and $v^-_{q,z}$, correspond to a speed value q.

The perturbation of the specified velocity field is represented by perturbation vectors at the sampling points. To determine the perturbation vectors, the representative velocity vector is located within one of eight octants defined by the mutually orthogonal axes, the eight octants identified by indices 0 to 7. A dimensionless unit vector of a direction of the representative velocity vector is projected on the x-axis, y-axis, and z-axis to produce fractions $\alpha_j$, $\beta_j$, $\gamma_j$, where j is an index of an octant in which the representative velocity is located. The perturbation vector located in octant j, corresponding to a representative velocity vector of speed S, is approximated by $\lambda_j$, $0 \leq j < 8$, according to expressions:

$$\lambda_0 = \alpha_0 v^+_{s,x} + \beta_0 v^+_{s,y} + \gamma_0 v^+_{s,z};$$

$$\lambda_1 = \alpha_1 v^-_{s,x} + \beta_1 v^+_{s,y} + \gamma_1 v^+_{s,z};$$

$$\lambda_2 = \alpha_2 v^+_{s,x} + \beta_2 v^-_{s,y} + \gamma_2 v^+_{s,z};$$

$$\lambda_3 = \alpha_3 v^-_{s,x} + \beta_3 v^-_{s,y} + \gamma_3 v^+_{s,z};$$

$$\lambda_4 = \alpha_4 v^+_{s,x} + \beta_4 v^+_{s,y} + \gamma_4 v^-_{s,z};$$

$$\lambda_5 = \alpha_5 v^-_{s,x} + \beta_5 v^+_{s,y} + \gamma_5 v^-_{s,z};$$

$$\lambda_6 = \alpha_6 v^+_{s,x} + \beta_6 v^-_{s,y} + \gamma_6 v^-_{s,z}; \text{ and}$$

$$\lambda_7 = \alpha_7 v^-_{s,x} + \beta_7 v^-_{s,y} + \gamma_7 v^-_{s,z}.$$

For a mobile object, the method comprises steps of: specifying traversed sampling points which the mobile object traverses at specified instants of time; determining background (principal) velocity vectors of the specified velocity field at the traversed sampling points; and determining propagating perturbations of the background velocity vectors caused by presence of the mobile object at the traversed sampling points by performing interpolation processes based on the reference velocity fields, the set of incremental velocity fields, and the background velocity vectors. The background velocity vectors and the propagating perturbations are presented to the display module. If, in addition to translation, rotations of the mobile object are specified at the specified instants of time, the background velocity vectors, relative to the mobile object, are adjusted according to respective angles of rotation.

The step of determining the set of incremental velocity fields is preferably based on solving Navier-Stokes differential equation over an extended period of time to determine a perturbed velocity field corresponding to each of the reference velocity fields. The reference velocity field is then subtracted from a corresponding perturbed velocity field to determine a differential velocity field. Temporal samples of the differential velocity field at predetermined relative time instants $t_1, t_2, \ldots, t_v$, $v \gg 1$, are recorded to produce v temporal samples for each of the sampling points within the bounded space. The incremental velocity vector at each sampling point is determined as a vectorial mean value of the ν temporal samples corresponding to each sampling point.

In accordance with another aspect, the present invention method for determining and displaying fluid flow in a bounded space in the presence of multiple objects. The method comprises steps of: defining a reference velocity field, of a specified direction, sustained within the bounded space; specifying individual identifiers of a set of reference objects; and determining a set of incremental velocity fields, caused by exclusively placing each reference object within the bounded space, for a number of object orientations relative to the specified direction and a number of predefined speed values of the reference velocity field. Reference information including the object orientations and incremental velocity fields relevant to each reference object are stored in a computer readable medium.

In a real-time application, a user specifies a current velocity field within the bounded space, a first identifier of a first object, position of the first object within the bounded space, and an indication of orientation of the first object. A first velocity vector in the current velocity field at the position is determined.

The first object is associated with a matching object from among the set of reference objects according to the first identifier and the individual identifiers of the set of reference objects. A first perturbation field of the current velocity field, caused by the first object, is then determined according to the first velocity vector, the orientation of the first object, and the reference information relevant to the matching object. The current velocity field and the first perturbation field are presented to a display module.

The individual identifiers may simply be indices (memory addresses) and the matching reference object may be selected according to an index of the first object. Alternatively, each of the reference objects may be characterized according to descriptors of physical attributes and the first object may be characterized according to the descriptors of physical attributes. The matching object is then selected according to proximity of descriptors of the first object to descriptors of each reference object.

The user may further specify a second identifier of a second object, a second velocity vector in the current velocity field at a position of the second object, and an indication of orientation of the second object. A new matching object is selected from among the set of reference objects according to the second identifier and the individual identifiers of the set of reference objects. A second perturbation field of the current velocity field, caused by the second object, is determined according to the second velocity vector, the orientation of the second object, and the reference information relevant to the new matching object.

The first perturbation field and the second perturbation field are combined to produce a combined perturbation field which is presented, together with the current velocity field, to the display module.

In accordance with a further aspect, the present invention provides an apparatus for determining and displaying fluid flow in a bounded space. The apparatus comprises: a repository of reference velocity fields sustained within the bounded space, each reference velocity field having a respective one of specified directions; a repository of descriptors of a plurality of reference objects; and a first engine for computing changes of velocity fields caused by placing an object within the bounded space. The changes of velocity fields are represented by incremental velocity vectors at selected sampling points around an object. A computer readable storage medium stores incremental velocity vectors of reference velocity fields acquired from the repository of reference velocity fields. The first and second engines, the first, second and third modules, the repository of reference velocity fields, and the repository of descriptors comprise a computer readable storage medium, e.g., a computer memory, DVD, CD-ROM, floppy, magnetic tape or other storage medium, having computer readable instructions stored thereon for execution by the processor.

The apparatus further comprises a first module for acquiring user-defined velocity fields and descriptors of user-defined objects, and correlating a user-defined object with the reference objects. A second engine operatively coupled to the first module and to the storage medium computes velocity perturbation of a user-defined velocity field caused by individually placing each of at least one user-defined object in the bounded space. A second module computes combined velocity perturbations of the user-defined velocity field caused by concurrent presence of the at least one user-defined object in the bounded space. A third module adds the user-defined velocity field to the combined velocity perturbations and presents a resulting perturbed velocity field to a display module.

The first engine comprises a computer readable storage medium having computer computer-readable instructions stored thereon for execution by a processor for solving Navier-Stokes' differential equations over an extended period of time to determine a perturbed velocity field corresponding to each of the reference velocity fields. The instructions further causes the first engine to: subtract each reference velocity field from a corresponding perturbed velocity field to determine a differential velocity field; record temporal samples of the differential velocity field at predetermined relative time instants $t_1, t_2, \ldots, t_\nu$, $\nu \gg 1$, thus collecting ν temporal samples for each sampling point of a plurality of sampling points within the bounded space; and determine each of the incremental velocity vectors representing the changes of velocity fields as a vectorial mean value of the ν temporal samples corresponding to each sampling point.

The first engine further comprises computer-readable instructions stored in a computer readable storage to perform the following: to select the specified directions of the reference velocity fields to be along mutually orthogonal axes referenced as an x-axis, a y-axis, and a z-axis and determine incremental velocity vectors $v^+_{s,x}, v^+_{s,y}, v^+_{s,z}, v^-_{s,x}, v^-_{s,y}$, and $v^-_{s,z}$ of reference velocity fields directed along a positive direction of the x-axis, a positive direction of the y-axis, a positive direction of the z-axis, a negative direction of the x-axis, a negative direction of the y-axis, and a negative direction of the z-axis, respectively. The incremental velocity vectors are determined for each speed value S of predefined speed values of reference velocity fields.

The second engine comprises a computer readable storage medium having computer-readable instructions stored thereon to perform the following: to project a dimensionless unit vector, of a direction of a representative velocity vector of the user-defined velocity field, on the x-axis, y-axis, and z-axis to produce fractions $\alpha_j, \beta_j, \gamma_j$, where j is an index of an octant, bounded by the mutually orthogonal axes, in which the representative velocity vector is located; and determine the velocity perturbation as a function of the fractions $\alpha_j, \beta_j, \gamma_j$, and the incremental velocity vectors $v^+_{s,x}, v^+_{s,y}, v^+_{s,z}, v^-_{s,x}, v^-_{s,y}$, and $v^-_{s,z}$.

The first module comprises a computer readable storage medium having computer-readable instructions stored thereon for performing the following: acquiring reference characterizing parameters of each of the reference objects from the repository of descriptors of reference objects; determining current characterizing parameters of a user-defined object according to predefined descriptors; determining a proximity metric indicating proximity of the current characterizing parameters to the reference characterizing parameters; and presenting a reference object, from among the plurality of reference objects, having minimum proximity metric to the second engine.

BRIEF DESCRIPTION OF THE DRAWINGS

Further features and advantages of the invention will be apparent from the following description of the embodiments, which are described by way of example only and with reference to the accompanying drawings, in which:

FIG. 9 illustrates an interpolation process within each of the four quadrants of FIG. 8, in accordance with an embodiment of the present invention;

FIG. 13 illustrates projection of two exemplary principal velocity vectors located within octants "000" and "101" on the three orthogonal axes for use in computing interpolated perturbed velocities, in accordance with an embodiment of the present invention;

FIG. 14 provides expressions for computing interpolated perturbed velocity vectors, in accordance with an embodiment of the present invention;

FIG. 16 illustrates an exemplary interpolation process based on the exemplary pre-computed perturbed velocity vectors of FIG. 15;

DETAILED DESCRIPTION OF THE EMBODIMENTS OF THE INVENTION

Terminology

Figure 1:
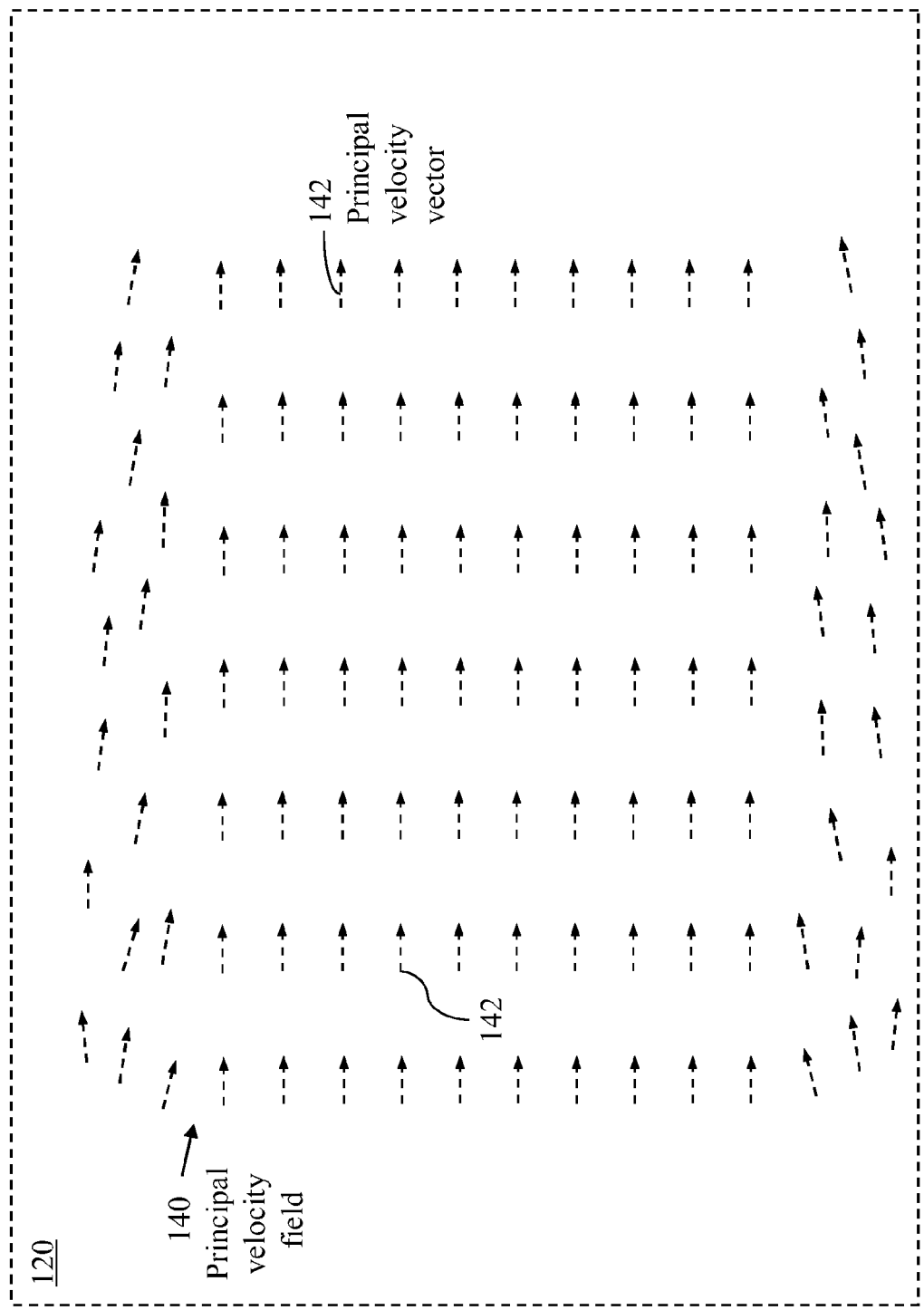
FIG. 1 illustrates an exemplary principal velocity field in a bounded space for use in illustrating embodiments of the present invention.

Fluid: The term is used herein to refer to any gas or liquid.
Object: The term object refers to a solid material or structure placed in a space sustaining fluid flow.
Velocity field: The term is used herein to refer to a vector field within a medium containing fluid where a vector at a specific point within the medium represents the velocity of a particle at the specific point.
Velocity vector: A velocity vector represents a velocity field at a specific point.
Principal velocity field: A principal velocity field, also called a background velocity field, is used herein to denote a velocity field induced within a bounded space of static boundary.
Principal velocity vector: A principal velocity vector, also called a background velocity vector, represents the velocity of a particle at a specific position within the bounded space.
Reference velocity fields: A reference velocity field is a principal velocity field of a predefined direction. The mutually orthogonal axes in a Cartesian-coordinate system are used herein to set directions of reference velocity fields.
Reference velocity vector: The velocity of a particle at a specific position of a bounded space supporting a reference velocity field is called a reference velocity vector.
Perturbed velocity field: A principal velocity field of liquid flow may be modified if an object is placed within the medium sustaining the liquid flow. The modified velocity field is called a perturbed velocity field.
Perturbed velocity vector: A principal velocity vector at a specific point may change direction and magnitude due to placing an object in a fluid flow. The modified velocity vector is called a perturbed velocity vector. A perturbed velocity vector represents a perturbed velocity vector as a given point in space.
differential velocity field: When placing an object in a principal velocity field results in a perturbed velocity field, the difference between the perturbed velocity field and the principal velocity field is called a differential velocity field.
Incremental velocity field: An incremental velocity field is a differential velocity field where the principal velocity field is a reference velocity field.
Perturbation velocity field: A perturbation velocity field is a differential velocity field where the principal velocity field is a user-defined velocity field of arbitrary direction.
Object parameters: An object may be characterized by parameters defining the object's shape, size, or orientation with respect to some coordinate system.

Proximity metric: The difference between characterizing parameters of one object and characterizing parameters of a second object defines proximity metric.
Spatial sampling points: A velocity field, whether a principal velocity field or differential velocity field, may be represented by respective velocity vectors at selected sampling points within a bounded space sustaining fluid flow. A spatial sampling point is simply called a "sampling point".
Temporal sampling: A velocity vector (principal or differential) at a spatial sampling point may change in magnitude and/or direction over time. Velocity vectors recorded at predetermined time instants are called temporal velocity samples.

Physical System

In fluid flows the presence of objects in a reference fluid velocity field of a context causes disturbances in the reference fluid velocity field resulting in an overall fluid velocity field. The disturbances can be modeled as the difference between the overall fluid velocity field and the reference velocity field. In some embodiments of the invention changes in the reference fluid flow velocity field caused by at least one entity in the context are determined. Information on the changes in the reference fluid flow velocity field is stored for later use in real-time applications. In some implementations, the changes in the reference fluid flow velocity field are obtained from analytical models both with and without the presence of the entities to obtain an overall fluid velocity field and a reference fluid velocity field, respectively. The changes in the fluid velocity field caused by the entities are obtained from the difference between the fluid flow velocity fields. The entities are any suitable objects or characters in a scene for example, or any other entity that can affect fluid flow such as an explosion, for example. Fluid velocity field distortions are obtained for different conditions. For example, changes in a fluid velocity field are determined for different fluid speeds and directions.

In many applications, it is desirable to characterize the fluid flow within a space which may be bounded or semi infinite. Fluid-flow characterization may be determined in terms of a velocity field defined according to particle velocity at points within the bounded space. FIG. 1 illustrates a bounded space 120 sustaining fluid flow having a velocity field 140 in the absence of any discontinuity within the bounded space. The bounded space 120 may be subjected to incident fluid streams which create the velocity field. The velocity field of a flow unimpeded by discontinuities is hereinafter referenced as a principal velocity field. The velocity field is represented by a finite number of velocity vectors 142, exhibited as arrows, each representing the magnitude and direction of the velocity of a particle in the vicinity of a respective point.

Figure 2:
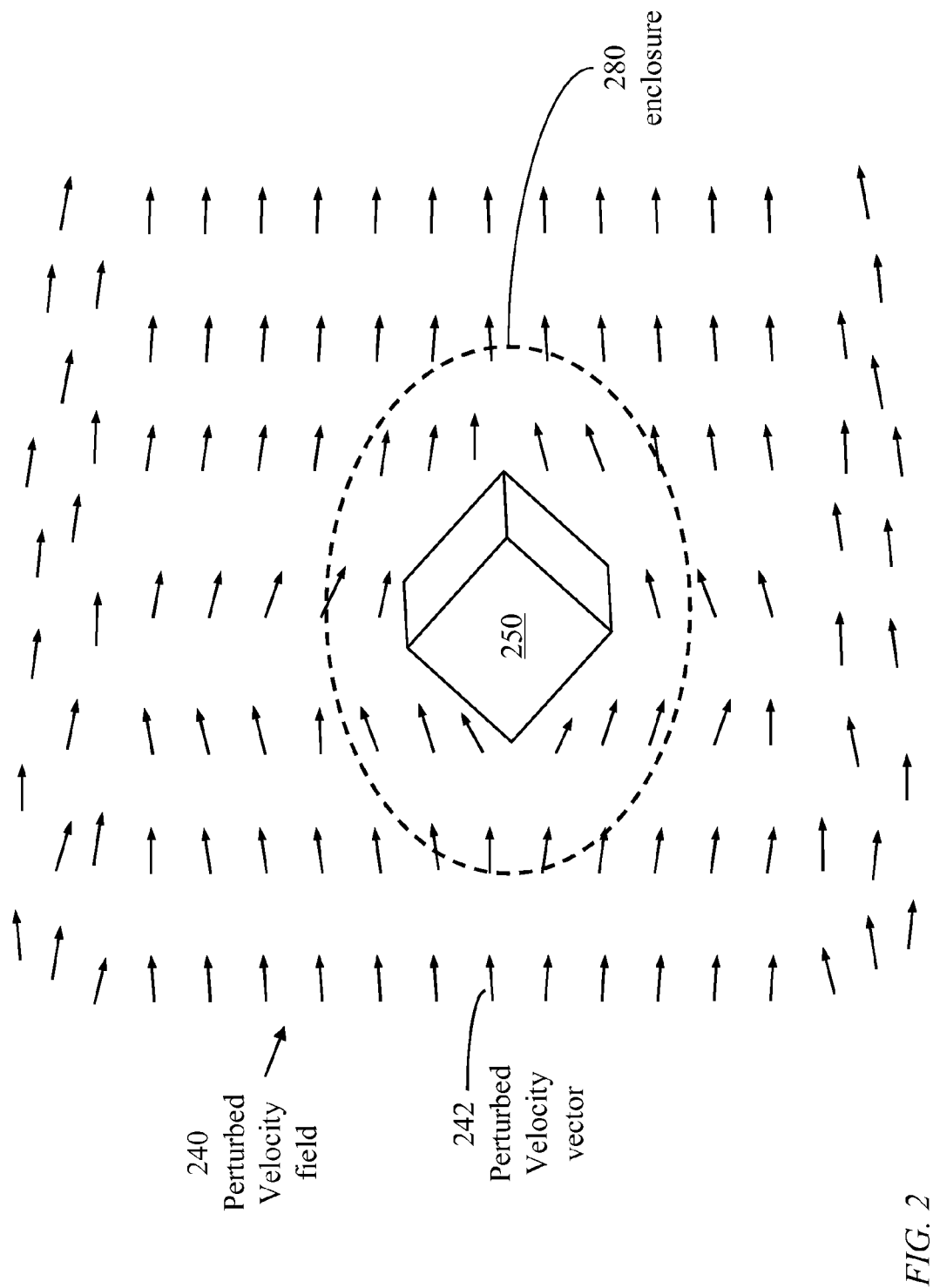
FIG. 2 illustrates perturbations of the principal velocity field of FIG. 1 caused by placing an object within the bounded space.

The bounded space 120 may enclose static or mobile impermeable objects which may cause noticeable perturbations of the velocity field. FIG. 2 illustrates a perturbed velocity field resulting from introducing an object 250 within the space 120. The effect of object 250 may be determined as the perturbed velocity field minus the principal velocity field. When two or more objects are placed simultaneously at respective positions, the combined effect of the objects may not equal the sum of the effects of the individual objects. However, under certain conditions, the combined effect may be approximated as the sum of the individual effects.

The velocity field may be precisely determined as a solution of a set of differential equations. Closed-form solutions of representative differential equations may be derived for specific "regular" shapes of the objects. Notably, even with object shapes which enable deriving closed-form expressions of the velocity field, actual numerical evaluation of the closed-form expressions at numerous points within the space may be computationally intensive.

In general, an object may have an arbitrary irregular shape, with arbitrary dimensions and arbitrary orientation with respect to the principal velocity field, which may force the use of numerical solutions. Typical numerical solutions are based on finite-element techniques well known in the art. Such techniques are often computationally intensive.

With the current availability of inexpensive processing capacity, precise analytical solutions may be determined for as many principal velocity fields at as many points within the bounded space as needed to support respective design decisions. However, in some applications, real-time display of the effect of changing the intensity or direction of an incident fluid stream, or the effect of a moving object, may be desirable. Therefore, methods for fast computation of velocity fields need be explored.

Figure 3:
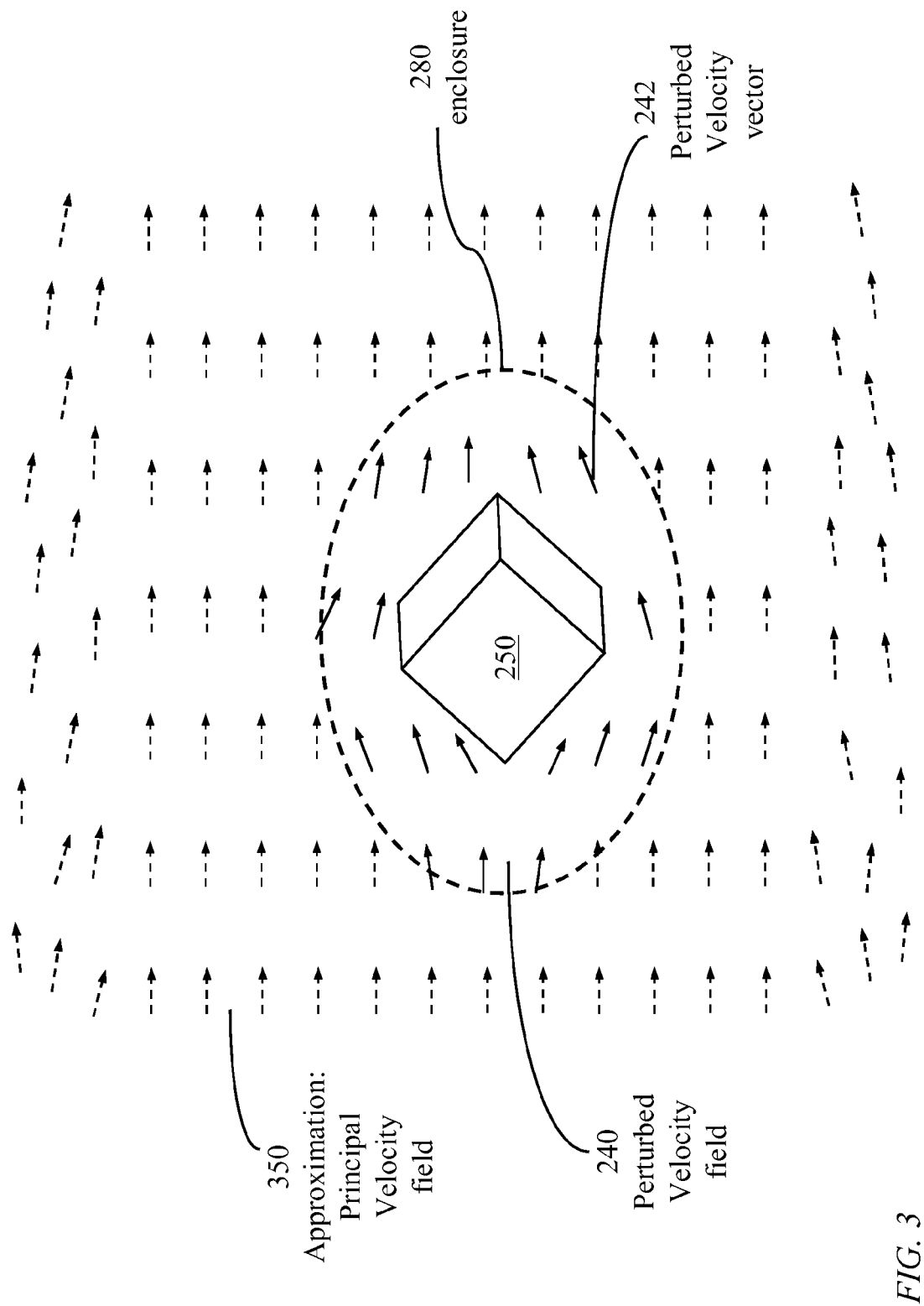
FIG. 3 illustrates an enclosure surrounding the object of FIG. 2 selected so that a velocity vector at a point outside the enclosure may be approximated to equal the principal velocity vector at the same point, in accordance with an embodiment of the present invention.

The velocity field may be computed at numerous points within the entire space then pruned by retaining only velocity vectors each having a magnitude exceeding a predefined threshold. Alternatively, a fictitious enclosure may be judicially selected to enclose the object and the velocity field is computed only at points within the space between the object and the surface 280 of enclosure. Perturbations of the velocity field outside the surface 280 are neglected. As illustrated in FIG. 2, perturbations of the velocity field decrease with distance from the object. As an approximation, the velocity field outside the surface 280 is considered to be identical to the corresponding principal field as illustrated in FIG. 3.

The positions of the object may be defined according to Cartesian coordinates, spherical coordinates, or cylindrical coordinates according to the preferred form of mathematical expressions describing the flow dynamics.

Figure 4:
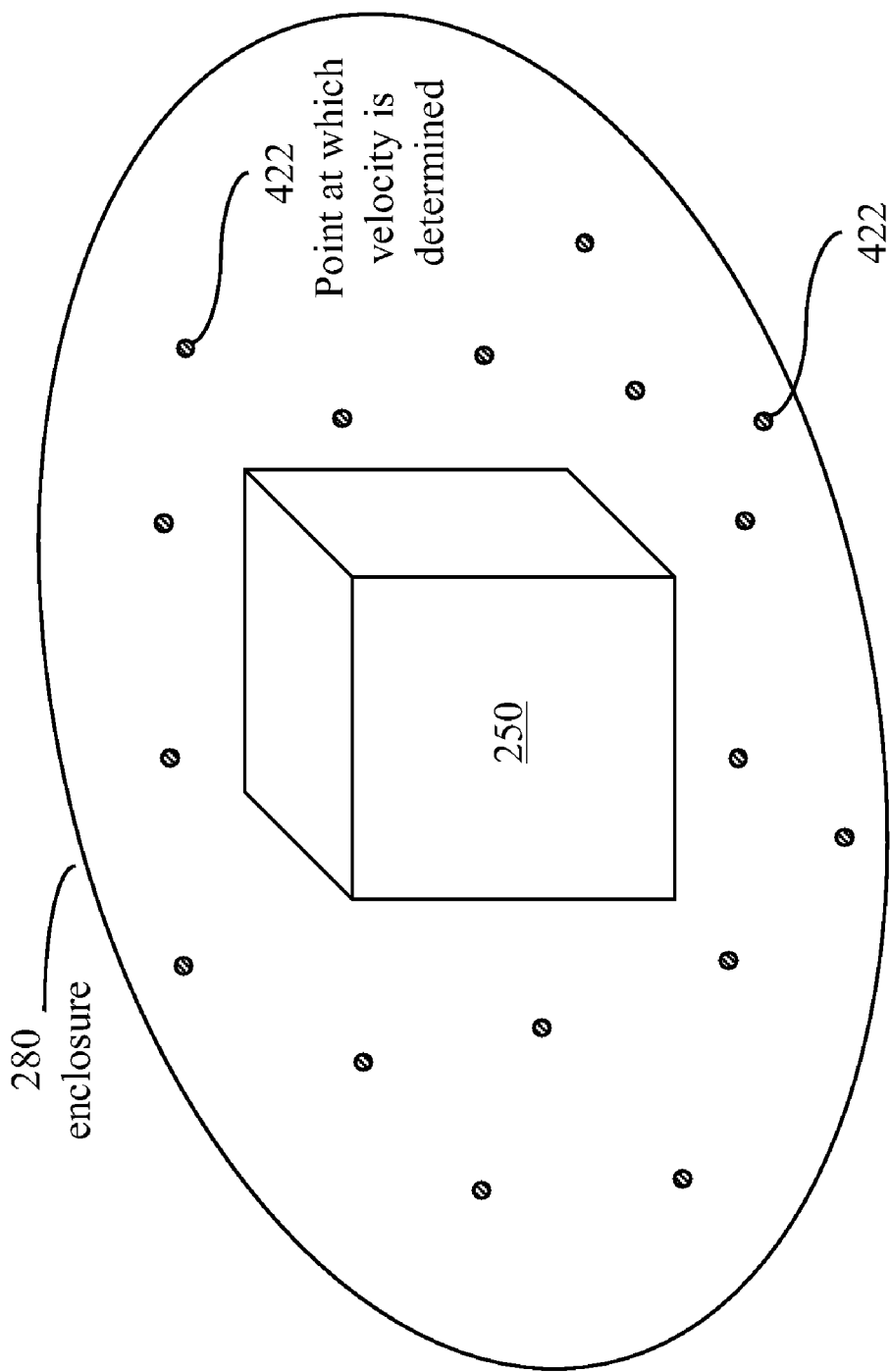
FIG. 4 illustrates sampling points, around an object, at which velocity-vector perturbations are computed, in accordance with an embodiment of the present invention.

FIG. 4 illustrates an object 250 and a surrounding enclosure 280. A corresponding velocity field is computed at candidate sampling points 422 to produce a sampled velocity field. The candidate sampling points 422 are selected according to some spatial-sampling rate that depends largely on the curvature of the velocity field which may vary significantly from one region to another within the bounded space 120. To reduce storage requirements and future real-time processing effort, any velocity vector representing perturbation below a predefined threshold may be omitted. Preferably, a common set of candidate sampling points 422 is used for each object 250, as illustrated in FIG. 4, to facilitate combining velocity vectors where multiple objects are simultaneously present, and to facilitate interpolation where an object moves along an arbitrary path within the bounded space.

It is desirable to compute and store the velocity field under numerous conditions of the principal velocity field. Under a given condition, the principal velocity vectors in the vicinity of an object may be considered to be of equal magnitude and direction. However, the magnitude of the velocity vector may vary over a wide range and the direction of the velocity vector, relevant to the object orientation may vary over a solid angle of $4\pi$.

The vector field is determined for velocity magnitudes selected to enable accurate interpolation, and sufficient velocity directions. The selected velocity magnitude (i.e., the speed) may vary between a lower bound and an upper bound in equal steps or according to a geometric series. For example, the speed may vary between 2 and 60 meters per second (i.e., 7.2 to 216 kilometers per hour) in 32 steps of 2 meters per second. Alternatively, the speed may vary between 1 meter per second and 64 meters per second (3.6 to 230.4 kilometers per hour) in seven steps: 1, 2, 4, 8, 16, 32, and 64 meters per second. The local coordinate axes associated with the object may be used to define reference velocity directions.

Figure 5:
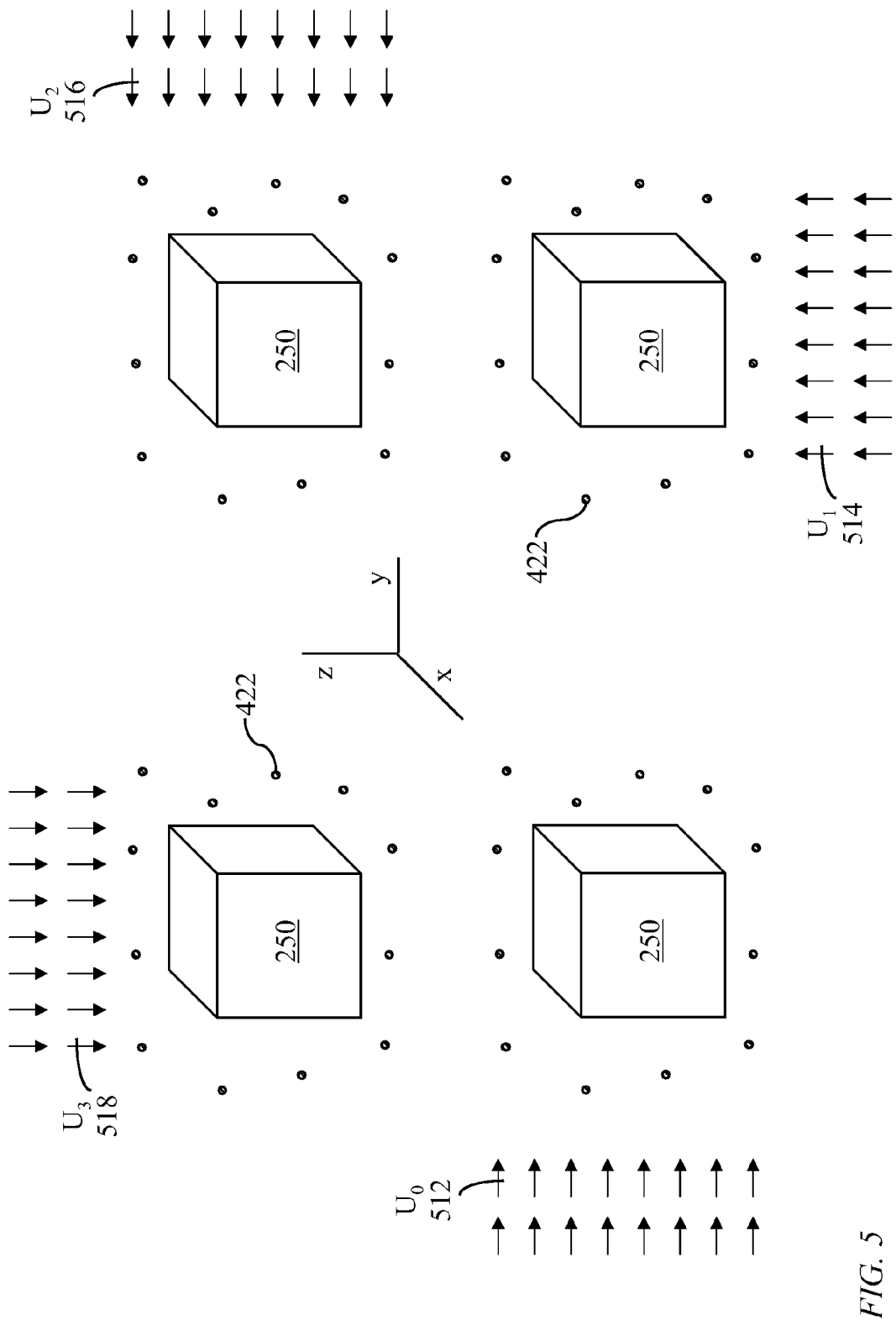
FIG. 5 illustrates the object of FIG. 4 successively placed in hypothetical principal velocity fields of predefined directions along two orthogonal axes where velocity perturbations caused by placing the object in each of the principal velocity fields is computed at sampling points for use in real-time interpolations, in accordance with an embodiment of the present invention.

FIG. 5 illustrates an object 250 with selected sampling point 422 placed in a principal velocity field where all principal velocity vectors are in parallel planes. In general, the object's orientation is determined according to a three dimensional coordinate system which may be a Cartesian system, a spherical system, or a cylindrical system. Selecting a Cartesian coordinate system to define the location of object 250, with axes referenced as an x-axis, a y-axis, and a z-axis, the parallel planes may be selected to be parallel to the y-z plane, for example. Four principal velocity directions may then be defined along the positive direction of the y-axis, the positive direction of the z-axis, the negative direction of the y-axis, and the negative direction of the z-axis as illustrated in FIG. 5, with object 250 represented by a cube oriented so that one planar side is parallel to the x-y plane and another planar side is parallel to the x-z plane or to the y-z plane, principal velocity vectors $U_0$, $U_1$, $U_2$, and $U_3$ (reference numerals 512, 514, 516, and 518) are perpendicular to planar sides parallel to the z-x, x-y, x-z, and y-x planes, respectively.

Figure 6:
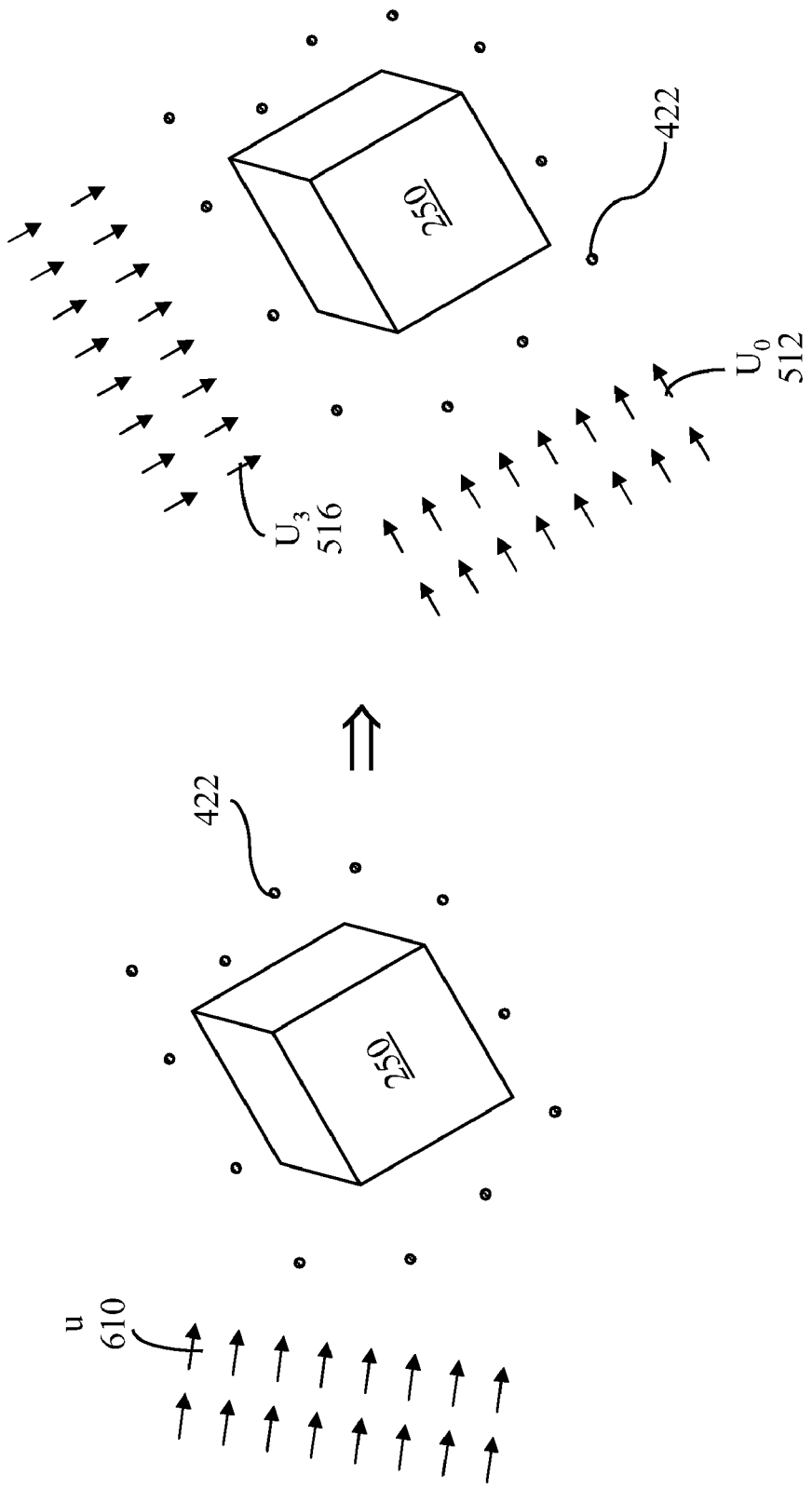
FIG. 6 illustrates a decomposition process where a principal velocity field of arbitrary direction is replaced by two orthogonal principal velocity fields for which velocity perturbations caused by an object have been stored, in accordance with an embodiment of the present invention.

When the object is oriented at a rotation angle $\theta$, $0<\theta<\pi/4$ with respect to the global coordinates and placed in the space at a location where the velocity field is at an angle of $-\psi$, $0<\psi<\pi/4$, as illustrated in FIG. 6, the relative direction of the velocity with respect to the local coordinates of the object is at an angle of $-(\psi+\theta)<0$. Hence, a velocity vector of magnitude S and angle $-\psi$ may be replaced by a projected component $S\times\cos(-(\psi+\theta))=S\times\cos(\psi+\theta)>0$ along the positive direction of the x-axis and a projected component $S\times\sin(-(\psi+\theta))<0$ along the negative direction of the y-axis. Thus, the velocity field evaluated at the sampling points is determined from pre-computed velocity fields determined under principal velocity vectors $U_0$ (512) and $U_3$ (518).

Figure 7:
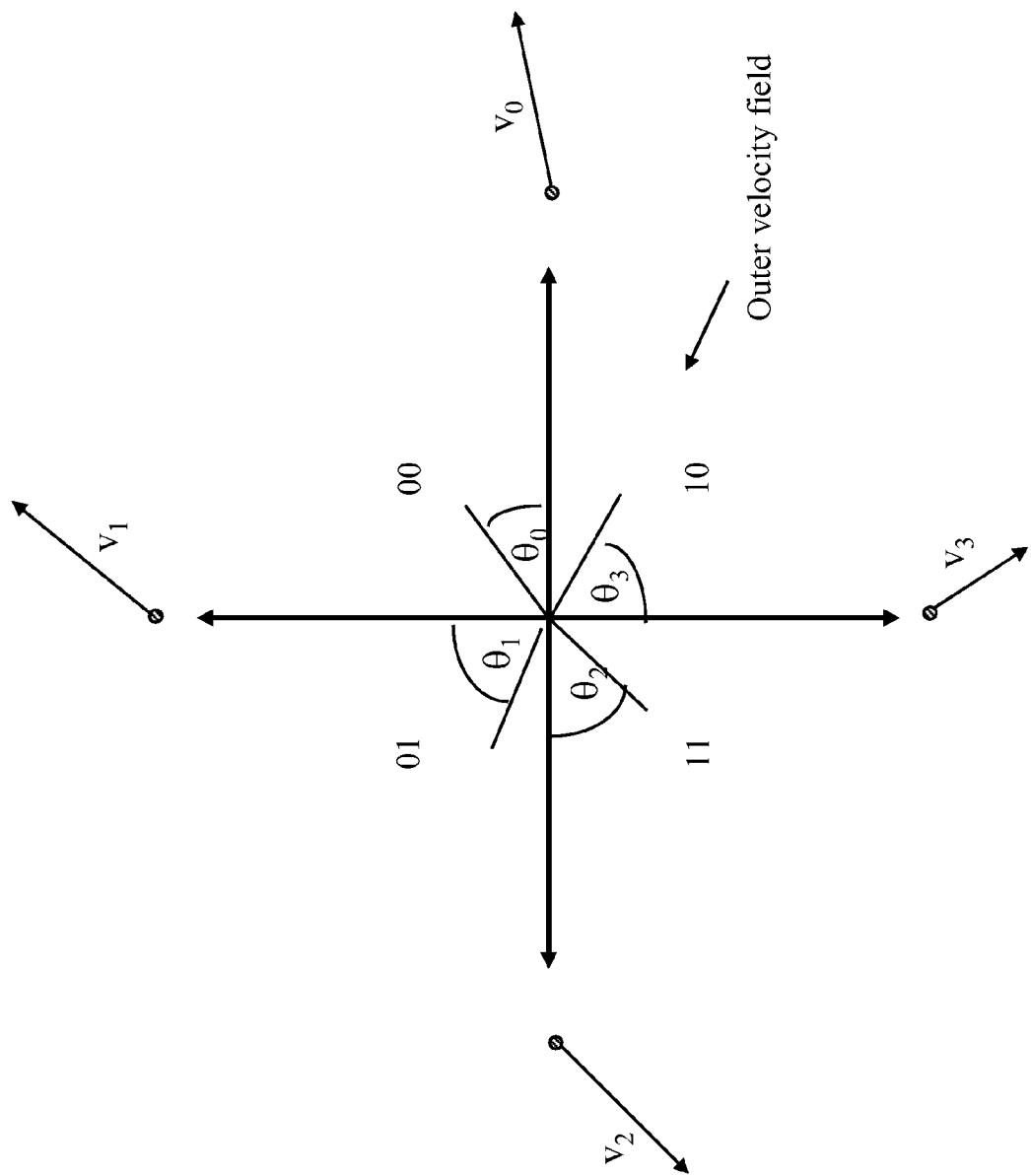
FIG. 7 illustrates an object successively placed in principal velocity fields of predefined magnitudes and predefined directions along three orthogonal axes where velocity perturbations are determined separately, at sampling points, for each direction for use in real-time calculations of perturbation fields under principal velocities of arbitrary magnitudes and directions, in accordance with an embodiment of the present invention.

The interpolation process is applied individually to the velocity vector at each sampling point. Consider a single sampling point at which the pre-computed incremental velocity vectors corresponding to a principal velocity field of a specific magnitude, S, and angles 0, $\pi/2$, $\pi$, and $3\pi/2$, are $v_0$, $v_1$, $v_2$, and $v_3$, respectively, as illustrated in FIG. 7. A principal velocity field of magnitude S directed at an angle $0<\theta_0<\pi/2$ from the positive direction of the x-axis results in a perturbation velocity vector determined as a function of $v_0$, $v_1$, and the angle $\theta_0$. A principal velocity field of magnitude S directed at an angle $0<\theta_1<\pi/2$ from the positive direction of the y-axis results in a perturbation velocity vector determined as a function of $v_1$, $v_2$, and the angle $\theta_1$. A principal velocity field of magnitude S directed at an angle $0<\theta_2<\pi/2$ from the negative direction of the x-axis results in a perturbation velocity vector determined as a function of $v_2$, $v_3$, and the angle $\theta_2$. A principal velocity field of magnitude S directed at an angle $0<\theta_3<\pi/2$ from the negative direction of the y-axis results in a perturbation velocity vector determined as a function of $v_3$, $v_0$, and the angle $\theta_3$.

Figure 8:
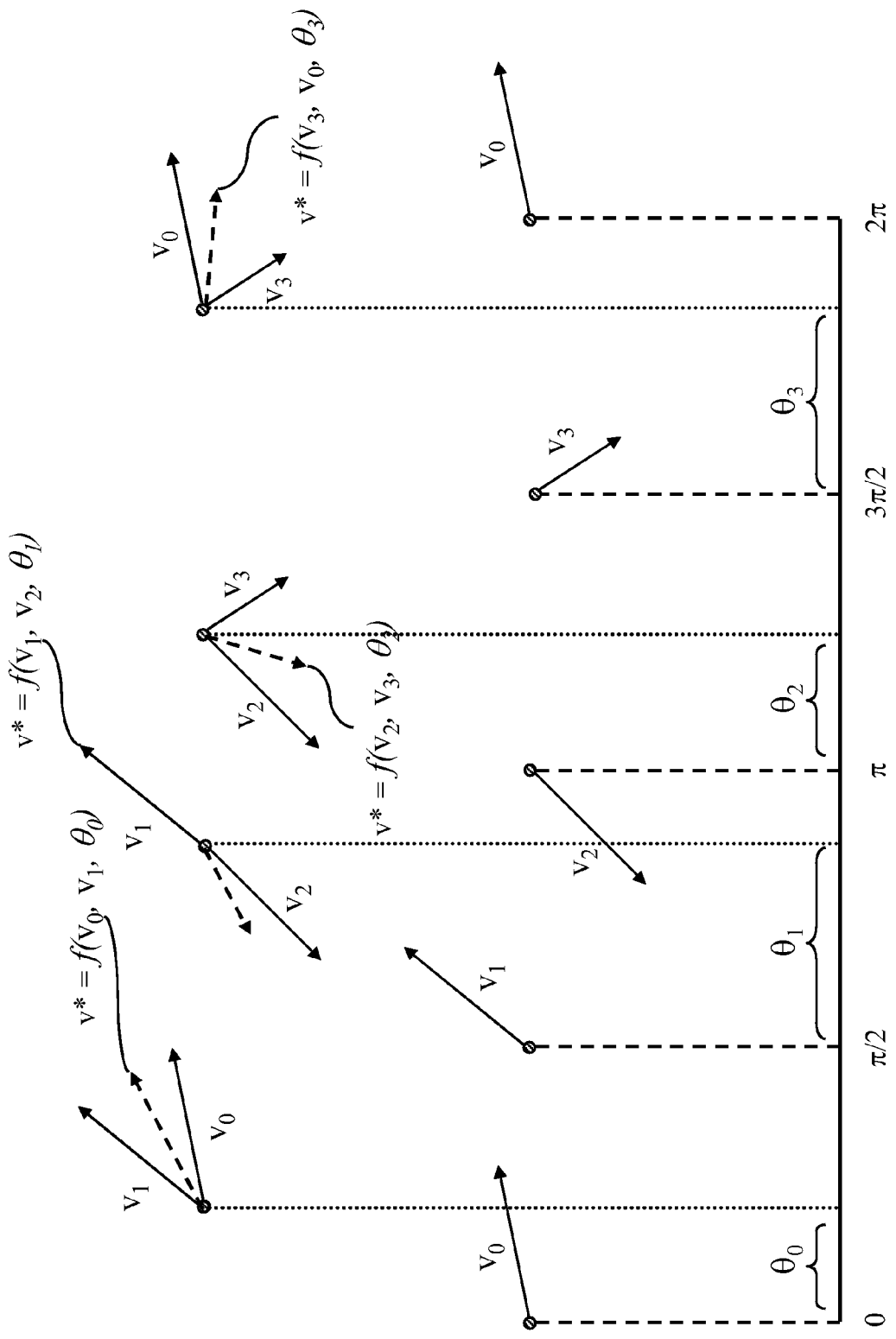
FIG. 8 illustrates perturbation velocity vectors, at a specific sampling point, determined separately for hypothetical principal fields along two orthogonal axes for use in computing perturbation velocity vectors under principal velocity fields of arbitrary directions, in accordance with an embodiment of the present invention.

FIG. 8 illustrates the interpolation processes corresponding to a principal velocity field with the directions indicated in FIG. 8 and described above. The abscissa of FIG. 8 indicates directions of principal velocity field within the planer angle $2\pi$. Exemplary incremental velocity vectors at $v_0$, $v_1$, $v_2$, and $v_3$, at angles 0, $\pi/2$, $\pi$, and $3\pi/2$, respectively, are illustrated. Interpolated perturbation velocity vectors at angles $\theta_0$, $(\pi/2)+\theta_1$, $\pi+\theta_2$, $(3\pi/2)+\theta_3$, are indicated as $f(v_0, v_1, \theta_0)$, $f(v_1, v_2, \theta_1)$, $f(v_2, v_3, \theta_2)$, $f(v_3, v_0, \theta_3)$, respectively.

Linear interpolation between two vectors $v_j$, $v_{j+1}$, $0 \leq j < 4$, where $v_4 \equiv v_0$, is determined as:

$$\phi_j = f(v_j, v_{j+1}, \theta_j) = v_j + (2\theta_j/\pi) \times (v_j - v_{j+1}),$$

as illustrated in FIG. 9.

In accordance with another embodiment of the present invention, a non-linear interpolation process is used, where a unit vector in the direction of the principal velocity vector is projected on the local coordinates associated with the object. Thus, defining $\alpha_j$ and $\beta_j$ as the projections of the unit vector along the x-axis and the y-axis, respectively, the interpolated perturbation velocity field is $$\lambda_j = f(v_j, v_{j+1}, \theta_j) = (\alpha_j v_j + \beta_j v_{j+1}).$$

The magnitude of $\lambda_j$, however, is not permitted to exceed the magnitude of either of the two vectors $v_j$ and $v_{j+1}$, i.e., $|\lambda_j|$ must be less than or equal to $\mu_j = \max\{|v_j|, |v_{j+1}|\} > 0$. Thus, if $|\lambda_j|$ exceeds $\mu_j$, the vector $\lambda_j$ is multiplied by the scalar $(\mu_j/|\lambda_j|)$.

Figure 10:
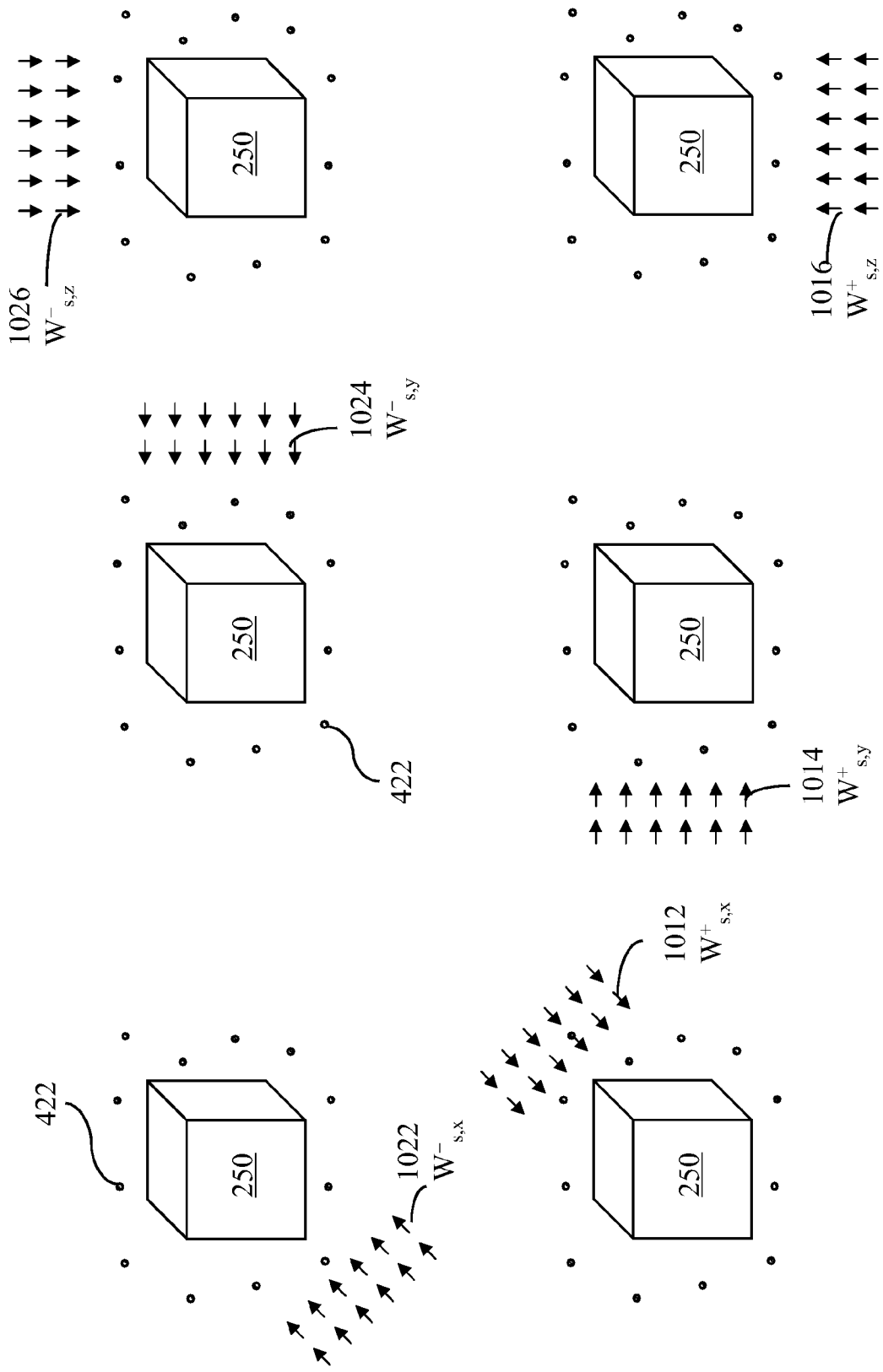
FIG. 10 illustrates linear and non-linear interpolation methods for determining perturbation velocity field under an arbitrary principal velocity field using results of the hypothetical principal fields, in accordance with an embodiment of the present invention.

In general, a vector may point to any direction within a solid angle of $4\pi$, in which case the simplification of FIG. 5 would not be applicable. Using Cartesian coordinates defined by an x-axis, y-axis, and z-axis, six principal velocity directions may be defined along the positive direction of the x-axis, the positive direction of the y-axis, the positive direction of the z-axis, the negative direction of the x-axis, the negative direction of the y-axis, and the negative direction of the z-axis as illustrated in FIG. 10. Pre-computed perturbed velocity vectors may be determined at the sampling points 422 of an object 250 under predefined principal velocity vectors $W^+_{s,x}$, $W^+_{s,y}$, $W^+_{s,z}$, $W^-_{s,x}$, $W^-_{s,y}$, $W^-_{s,z}$, (reference numerals 1012, 1014, 1016, 1022, 1024, and 1026 respectively) with selected magnitudes covering a predefined speed range.

Figure 11:
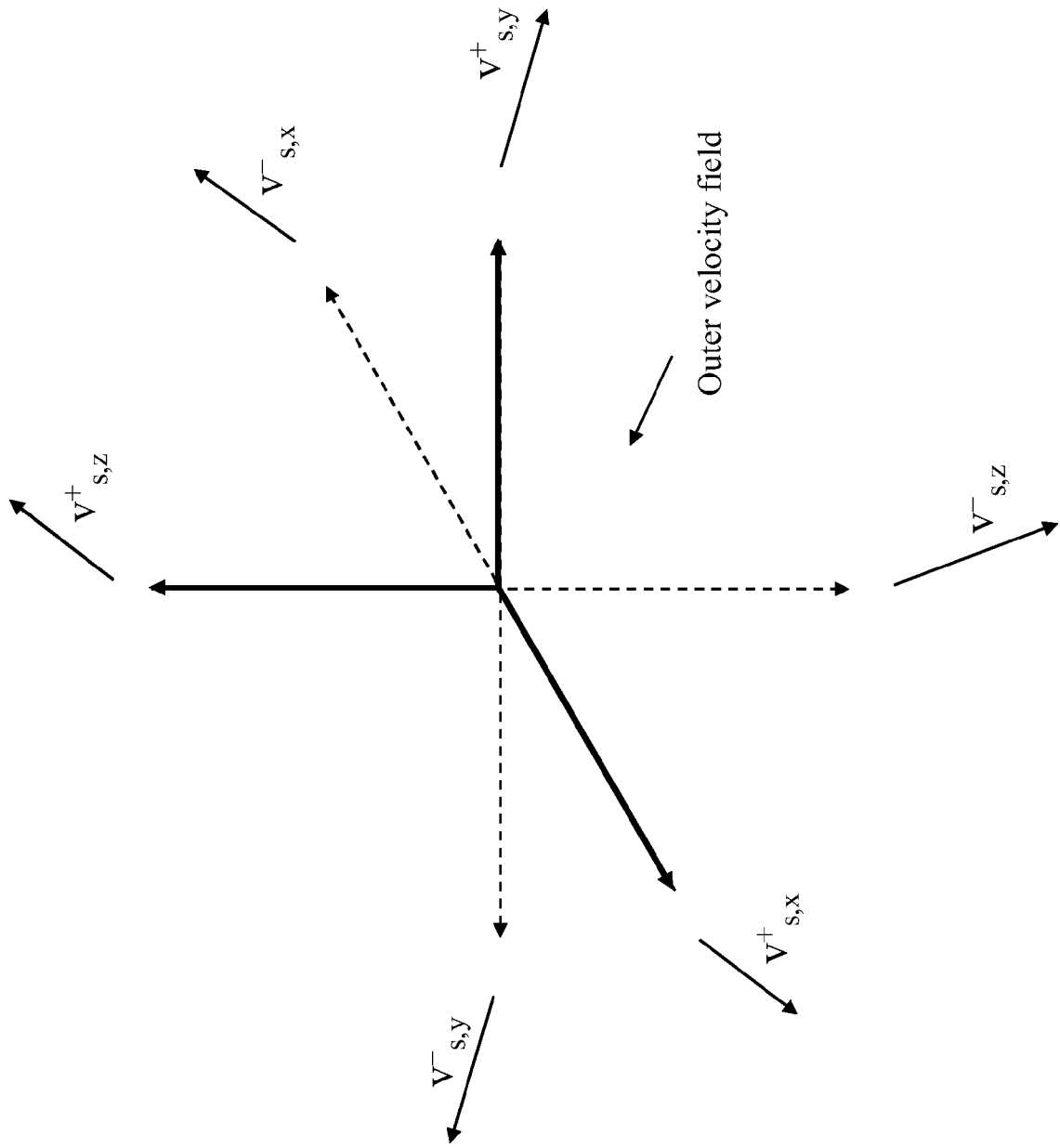
FIG. 11 illustrates six velocity vectors, at a specific sampling point, determined under hypothetical principal velocity fields of preselected magnitudes and six directions along three orthogonal axes, for use in computing perturbed velocity vectors under a principal velocity field of arbitrary magnitude and direction, in accordance with an embodiment of the present invention.

As described above, the interpolation process is applied individually to the velocity vector at each sampling point. Consider a specific sampling point at which the pre-computed incremental velocity vectors corresponding to a principal velocity field of a specific magnitude, S, and along the six directions described above, are $v^+_{s,x}$, $v^+_{s,y}$, $v^+_{s,z}$, $v^-_{s,x}$, $v^-_{s,y}$, $v^-_{s,z}$, as illustrated in FIG. 11.

Figure 12:
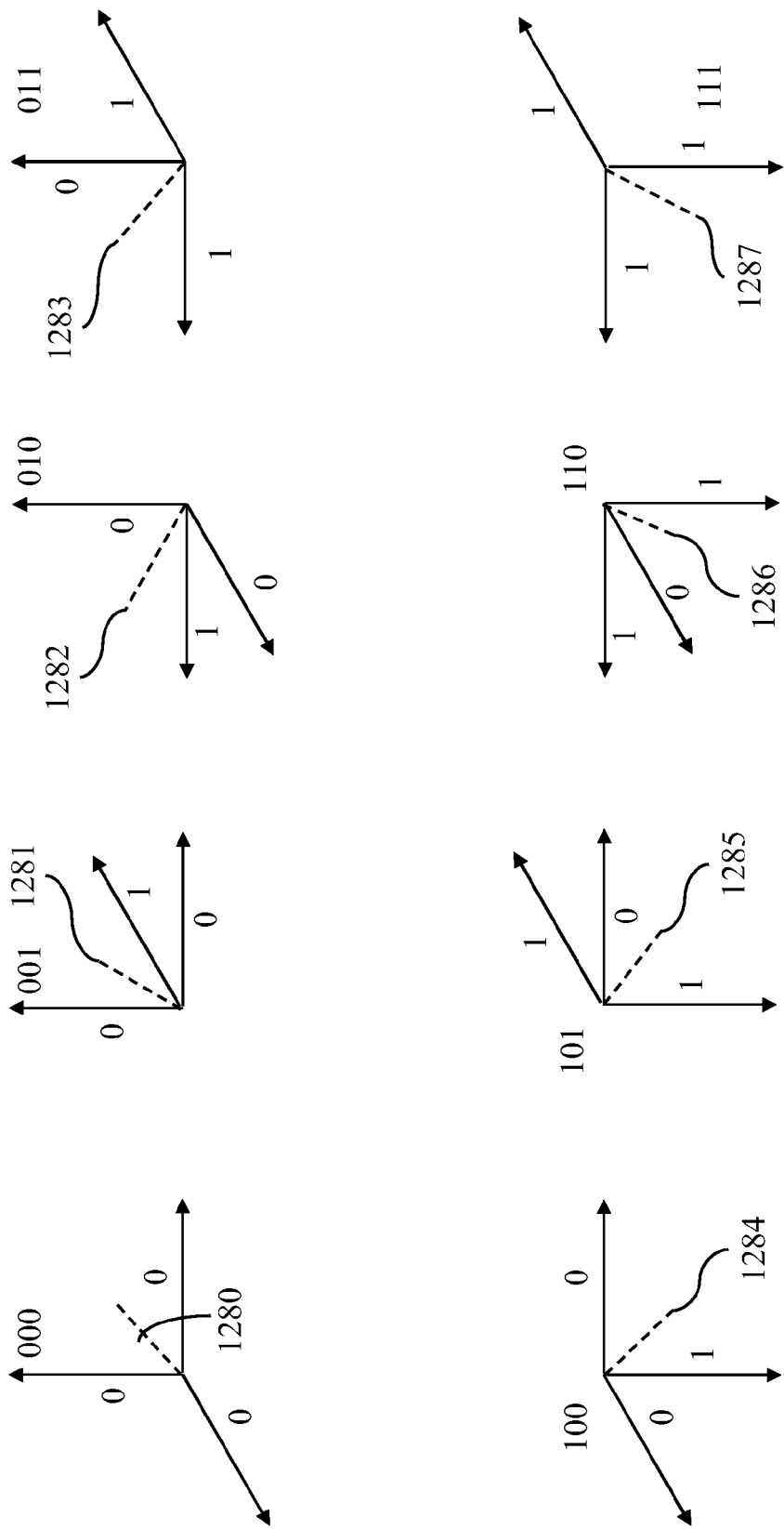
FIG. 12 illustrates association of a principal velocity vector with one of eight octants defined by three orthogonal axes to facilitate an interpolation process, in accordance with an embodiment of the present invention.

A principal velocity field of magnitude S and an arbitrary direction yields a perturbation velocity vector, at the specific point, which may be determined by associating the principal velocity field with one of the eight octants 000, 001, . . . , 111 illustrated in FIG. 12. Principal velocity vectors 1280, 1281, 1282, 1283, 1284, 1285, 1286, and 1287 are associated with octants "000" to "111", respectively. The perturbation velocity vector is determined by interpolation among three of the six perturbed velocities $v^+_{s,x}$, $v^+_{s,y}$, $v^+_{s,z}$, $v^-_{s,x}$, $v^-_{s,y}$, $v^-_{s,z}$ associated with the proper octant.

Projected components along the x, y, and z axes respectively, define the proper octant. FIG. 13 illustrates a velocity vector in octant "000" having projected components $\alpha_0$, $\beta_0$, and $\gamma_0$ along the positive directions of the x-axis, y-axis, and z-axis, respectively, and a velocity vector in octant "101" having projected components $\alpha_5$, $\beta_5$, and $\gamma_5$ along the positive directions of the x-axis, y-axis, and z-axis, respectively.

FIG. 14 presents interpolated values $\lambda_j$, $0 \leq j < 8$, of perturbation velocity vectors for a principal velocity vector of speed S. A dimensionless unit vector of a direction of the principal velocity vector is projected on mutually orthogonal x-axis, y-axis, and z-axis to produce fractions $\alpha_j$, $\beta_j$, $\gamma_j$, respectively, where j is an index of an octant ("000" to "111") in which the principal velocity vector is located. The reference incremental velocity components of the eight octants "000" to "111" are $\{v^+_{s,x}, v^+_{s,y}, v^+_{s,z}\}$, $\{v^-_{s,x}, v^+_{s,y}, v^+_{s,z}\}$, $\{v^+_{s,x}, v^-_{s,y}, v^+_{s,z}\}$, $\{v^-_{s,x}, v^-_{s,y}, v^+_{s,z}\}$, $\{v^+_{s,x}, v^+_{s,y}, v^-_{s,z}\}$, $\{v^-_{s,x}, v^+_{s,y}, v^-_{s,z}\}$, $\{v^+_{s,x}, v^-_{s,y}, v^-_{s,z}\}$, and $\{v^-_{s,x}, v^-_{s,y}, v^-_{s,z}\}$. The magnitude of an interpolated perturbation velocity $\lambda_j$ within octant j is constrained to be less than or equal to the magnitude $\mu_j$ of the largest reference velocity component of octant j. Thus, if $\lambda_j$ is greater than zero and exceeds $\mu_j$, the velocity vector $\phi_j$ at the sampling point under consideration is determined as $\lambda_j$ multiplied by the scalar $(\mu_j/\lambda_j)$. Otherwise, $\phi_j$ equals $\lambda_j$.

The perturbation of the principal velocity field is represented by perturbation vectors at sampling points. The principal velocity vector is located within one of eight octants defined by the mutually orthogonal axes; the eight octants are identified by indices 0 to 7.

The interpolation process is performed according to the expressions:

$$\lambda_0 = \alpha_0 v^+_{s,x} + \beta_0 v^+_{s,y} + \gamma_0 v^+_{s,z};$$

$$\lambda_1 = \alpha_1 v^-_{s,x} + \beta_1 v^+_{s,y} + \gamma_1 v^+_{s,z};$$

$$\lambda_2 = \alpha_2 v^+_{s,x} + \beta_2 v^-_{s,y} + \gamma_2 v^+_{s,z};$$

$$\lambda_3 = \alpha_3 v^-_{s,x} + \beta_3 v^-_{s,y} + \gamma_3 v^+_{s,z};$$

$$\lambda_4 = \alpha_4 v^+_{s,x} + \beta_4 v^+_{s,y} + \gamma_4 v^-_{s,z};$$

$$\lambda_5 = \alpha_5 v^-_{s,x} + \beta_5 v^+_{s,y} + \gamma_5 v^-_{s,z};$$

$$\lambda_6 = \alpha_6 v^+_{s,x} + \beta_6 v^-_{s,y} + \gamma_6 v^-_{s,z}; \text{ and}$$

$$\lambda_7 = \alpha_7 v^-_{s,x} + \beta_7 v^-_{s,y} + \gamma_7 v^-_{s,z}.$$

Figure 15:
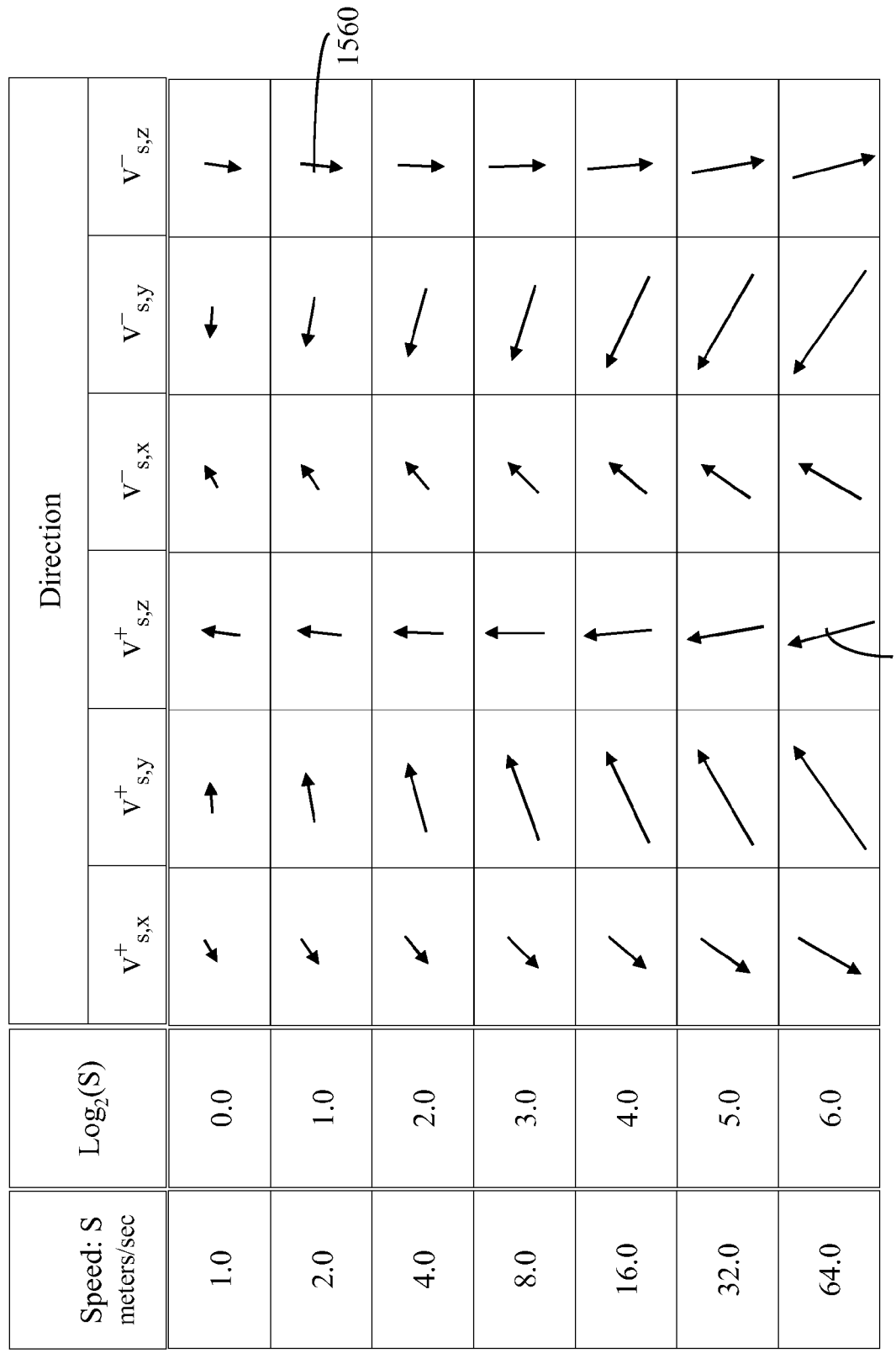
FIG. 15 illustrates exemplary pre-computed perturbed velocity vectors at a sampling point of a perturbed velocity field caused by an object placed in a bounded space sustaining hypothetical principal velocity field of specific magnitudes where, for each magnitude, the principal velocity field is successively directed along opposite directions of three orthogonal axes, the pre-computed perturbed velocity vectors to be used for determining a perturbed velocity vector at the sampling point under principal velocity fields of arbitrary magnitudes and direction, in accordance with an embodiment of the present invention.

FIG. 15 illustrates stored pre-computed incremental velocity vectors $v^+_{s,x}$, $v^+_{s,y}$, $v^+_{s,z}$, $v^-_{s,x}$, $v^-_{s,y}$, $v^-_{s,z}$ for different values of the magnitude (the speed, S) of the reference principal velocity fields $W^+_{s,x}$, $W^+_{s,y}$, $W^+_{s,z}$, $W^-_{s,x}$, $W^-_{s,y}$, $W^-_{s,z}$ illustrated in FIG. 10. The speed, S, varies between 1 meter per second and 64 meters per second (3.6 to 230.4 kilometers per hour) in seven steps: 1, 2, 4, 8, 16, 32, and 64 meters per second. The stored velocity vectors 1560 are used for fast real-time computation of perturbation velocity vectors under varying principal velocity fields. The velocity vectors of FIG. 15 are computed for each object of interest.

FIG. 16 illustrates an interpolation process where an object 250 is placed in a position within a bounded space where a current principal velocity field is along the direction 1282 (FIG. 12). Thus, the reference incremental velocity vectors $\{v^+_{s,x}, v^-_{s,y}, v^+_{s,z}\}$, together with the projections $\alpha_2$, $\beta_2$, and $\gamma_2$, on the x, y, and z axes, of a dimensionless unit vector oriented along the current principal velocity field, are used to determine the perturbation velocity field corresponding to the current principal velocity field (FIG. 14). The perturbation velocity vectors $\{v^+_{s,x}, v^-_{s,y}, v^+_{s,z}\}$ are pre-computed for the values of S listed in FIG. 15 but the current principal velocity may assume any value within the predefined range of 1 to 64 meters per second. Thus, before applying the expressions of FIG. 14, interpolated values of $\{v^+_{s,x}, v^-_{s,y}, v^+_{s,z}\}$ at a current value of S are determined. Any of several methods of interpolation may be used. For example, with S=11, the nearest two values 8 and 16, in the list of FIG. 15, may be used.

Linear interpolation using the absolute values of S yields:

$$v^+_{11,x} = 0.625 v^+_{8,x} + 0.375 v^+_{16,x};$$

$$v^-_{11,y} = 0.625 v^-_{8,y} + 0.375 v^-_{16,y}; \text{ and}$$

$$v^+_{11,z} = 0.625 v^+_{8,z} + 0.375 v^+_{16,z}.$$

Linear interpolation using the logarithms of S yields:

$$v^+_{11,x} = 0.5406 v^+_{8,x} + 0.4594 v^+_{16,x};$$

$$v^-_{11,y} = 0.5406 v^-_{8,y} + 0.4594 v^-_{16,y}; \text{ and}$$

$$v^+_{11,z} = 0.5406 v^+_{8,z} + 0.4594 v^+_{16,z}.$$

Consider an experiment in which the principal velocity field is kept unchanged while ν objects, ν>1, are placed, one at a time, at respective predetermined ν positions within the bounded space 120. For each object, the velocity field is evaluated and the deviation of the evaluated velocity field from the principal velocity field is recorded. Thus, ν incremental velocity fields are available for real-time use. As a first approximation, a velocity field corresponding to presence of any subset of objects, selected from among the ν objects, may be determined by vectorial summation of the principal velocity field and the incremental velocity field corresponding to each object in the subset of objects.

Figure 17:
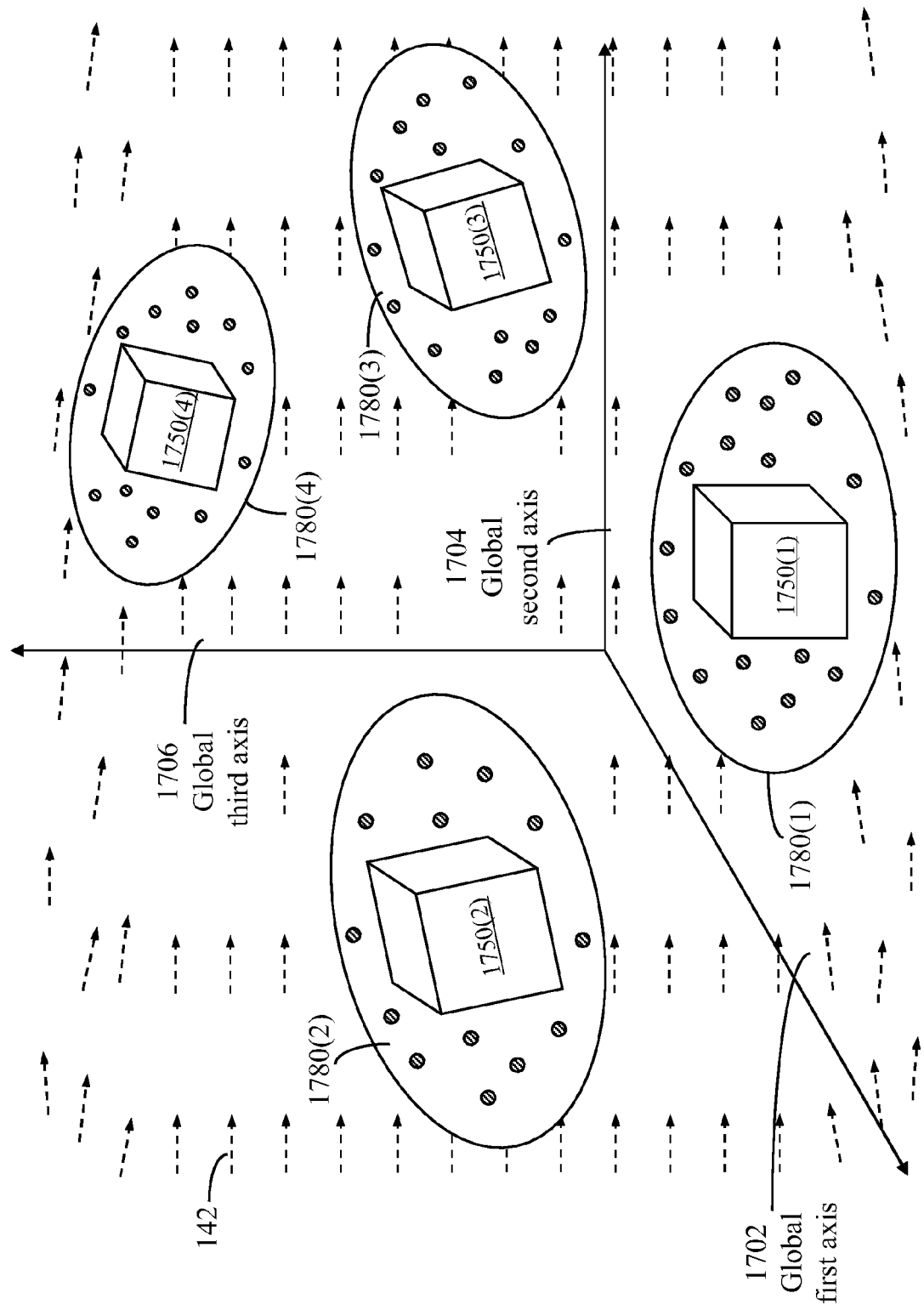
FIG. 17 illustrates approximated perturbation of a principal velocity field, within a bounded space, caused by placement of objects within the bounded space where perturbations are localized around each object, in accordance with an embodiment of the present invention.

FIG. 17 illustrates four objects 1750, individually identified as 1750(1) to 1750(4), placed in a bounded space sustaining a specified principal velocity field. In general, the objects 1750 may be of different shapes, dimensions, or orientations, and may be present simultaneously or individually during non-overlapping periods of time. An enclosing ellipsoid 1780 encloses each object and the perturbed velocity field is determined at selected points in the space between an object and its enclosing ellipsoid. The velocity field within the space outside the four ellipsoids enclosing the four objects is approximated to equal the principal velocity field.

Figure 18:
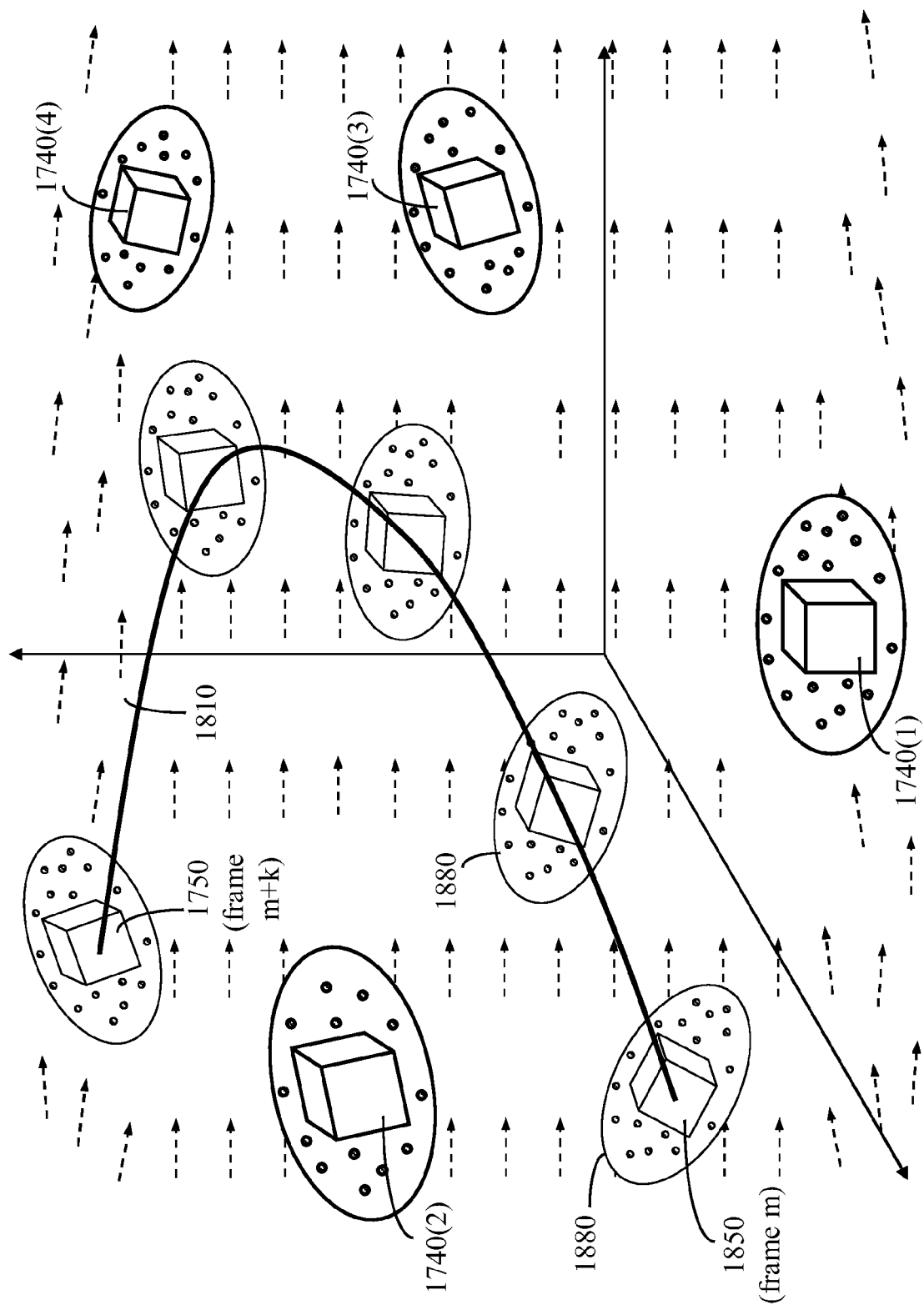
FIG. 18 illustrates successive velocity-field perturbations caused by a moving object within the bounded space of 17.

The combined velocity field is presented to a display module (not illustrated) which forms frames for visual display on a computer screen at a specified frame rate; for example at a rate of 50 frames per second. FIG. 18 illustrates the bounded space of FIG. 17 in which a fifth object moves along a trajectory 1810. The object's motion may include both translation and rotation. A first display of the object appears during a given frame, identified as a frame of serial number m. As the fifth object moves, the velocity perturbations around the object need be re-computed in real time. The computation time of a new perturbation pattern may exceed a frame time, in which case the frame-content related to the moving object may be updated at a rate lower than the frame rate, for example every five frame periods.

Figure 19:
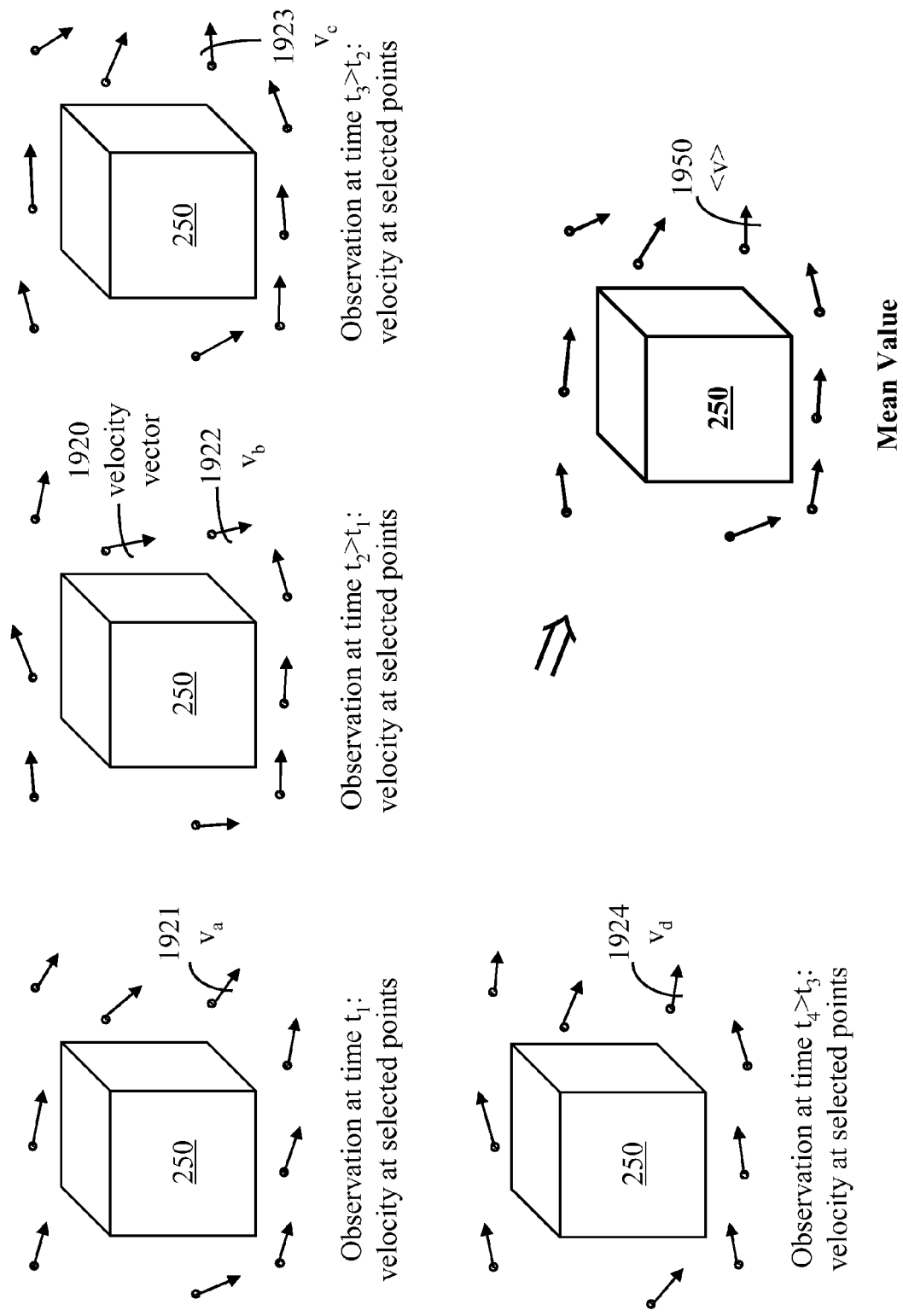
FIG. 19 illustrates temporal samples of perturbed velocity vectors at spatial sampling points around an object placed in a bounded space sustaining a principal velocity field where a vectorial mean value of the perturbed velocity vectors at each of the spatial sampling points are stored for subsequent real-time computation, in accordance with an embodiment of the present invention.

FIG. 19 illustrates an object placed in a principal velocity field with the velocity field determined at selected sampling points surrounding the object. The velocity vectors at the selected points determined at time instants $t_1, t_2, \ldots, t_\nu, \nu \gg 1$, are recorded. The sampled velocity field at only four time instants $t_1, t_2, t_3,$ and $t_4$ are illustrated. The vectorial mean value of the ν vectors corresponding to each sampling point is determined and the resulting mean value of the perturbed velocity field is stored for future use in real-time computation of perturbed velocity fields under various principal velocity-field conditions and various object orientations.

Computational System

In accordance with the present invention, real-time computation of the velocity field for arbitrarily specified scenarios relies on pre-computing and storage of the velocity field for pivotal scenarios. A scenario may be defined according to a velocity field and a formation of objects of specific shapes, dimensions, and orientations. The velocity field corresponding to arbitrary, rapidly changing, scenarios may be determined by interpolation of velocity fields of judicially selected pivotal scenarios. Several factors need be carefully considered in selecting the pivotal scenarios and computing respective velocity fields. Furthermore, techniques of identifying significant changes only between successive scenarios need be employed in order to reduce required storage capacity and real-time interpolation effort.

A sampled velocity field may be computed for a large number of objects 250 to enable accurate synthesis of velocity fields in the presence of objects of arbitrary shapes or in a case of a moving object. Selecting the number of objects 250, their shapes, and relative positions, takes into account several factors such as pre-processing effort, storage capacity, and real-time processing effort. A large number of experimental objects may reduce real-time effort through direct look-up operations at the expense of storage and pre-processing effort. Using a small number of objects may necessitate fast execution of multi-dimensional interpolation processes for real-time flow-pattern display under arbitrary conditions.

Figure 20:
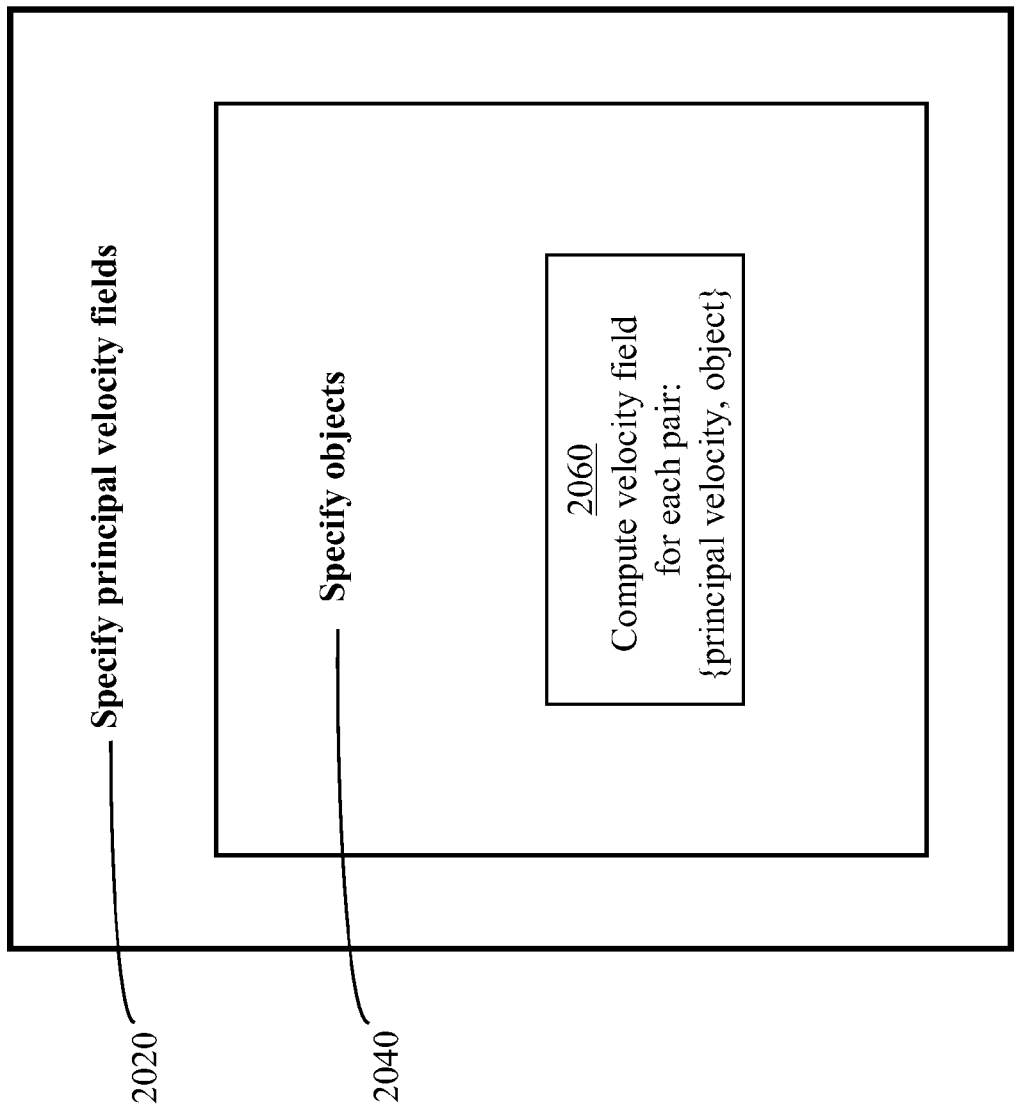
FIG. 20 illustrates basic processes for computing reference perturbed velocity fields, in accordance with an embodiment of the present invention.

FIG. 20 provides an overview of a process of pre-computing incremental velocity fields under specific conditions for subsequent use in fast real-time computation of velocity fields under varying conditions. A process 2020 specifies reference principal velocity fields. A velocity field may be characterized by the magnitude (speed) and direction of velocity vectors at specified points in a bounded space. A process 2040 specifies objects, each object characterized according to shape, size, and orientation, amongst other attributes. For each combination of a velocity field and an object, precise methods for computing perturbation of the principal velocity field due to the flow discontinuity caused by placement of the object within the bounded space is computed in step 2060.

Figure 21:
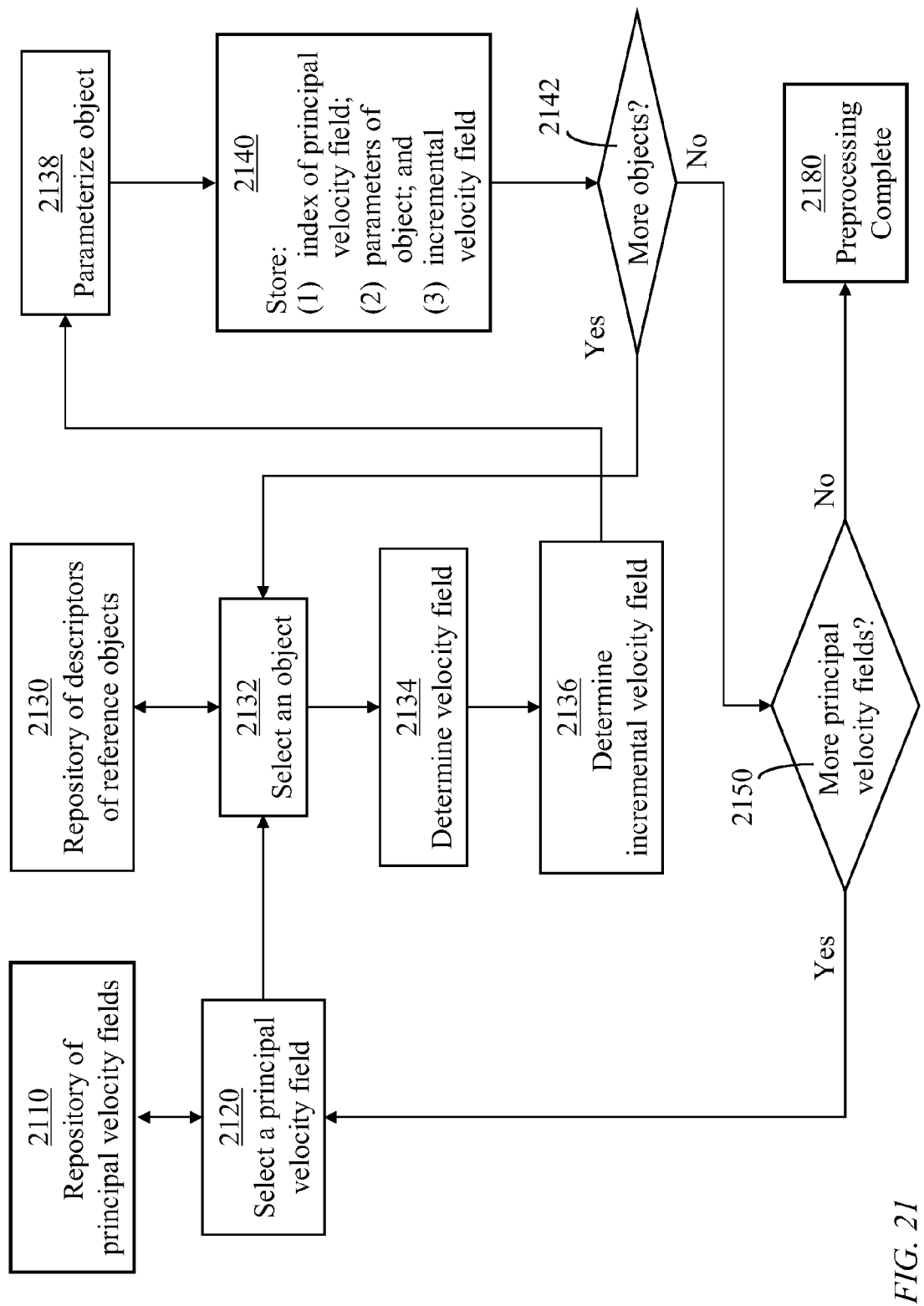
FIG. 21 details pre-computation of reference perturbation velocity fields, in accordance with an embodiment of the present invention.

FIG. 21 provides further details of the processes of FIG. 20. A repository 2110 of principal velocity fields and a repository 2130 of descriptors of reference objects or object formations are provided, each repository 2110 and 2130 comprising a computer readable storage medium, e.g., a computer memory, DVD, CD-ROM, floppy, magnetic tape or other storage medium, comprising computer readable instructions stored thereon. A principal velocity field from among the stored velocity fields is selected in step 2120. An object is selected from among the stored objects in step 2132. The selected object perturbs the principal velocity field and the perturbed velocity field is determined in step 2134 using any of available mathematical models. An incremental velocity field is determined in step 2136 as the difference between the perturbed velocity field and the original velocity field. The incremental velocity field may be pruned by omitting each velocity vector having a magnitude below a given threshold. The threshold may be a function of the mean value of the magnitudes of the principal velocity vectors. Additionally, the computation of the perturbed velocity field in step 2134 may be limited to a spatial layer surrounding the object.

In subsequent real-time computation of a perturbed velocity field in the presence of the selected object, the object description may be retrieved according to indices of storage addresses within the repository 2130. However, it may be desirable to determine a perturbed velocity field in the presence of an object that is not included in the repository 2130. Thus, the selected object may be characterized according to some properties such as slenderness ratio or dimensions and orientation of an enveloping regular shape such as a parallelepiped shape. The object's characterizing properties may then be expressed in terms of parameters. Characterizing parameters of an arbitrary object may then be compared with parameters of objects for which incremental velocity fields have been determined in step 2136 to determine the nearest reference object.

Step 2140 formulates a record indicating an index of the principal velocity field selected in step 2120, indices, and where available characterizing parameters, of the object selected in step 2132, and the incremental velocity field determined in step 2136. Steps 2132, 2134, 2136, 2138, 2140, and 2142 are repeated until step 2142 determines that all object formations in repository 2130 have been processed. When all object formations are considered, step 2150 determines whether to execute step 2120 to select a new principal velocity field from repository 2110 or terminate the pre-computation of reference incremental velocity fields in step 2180.

Figure 22:
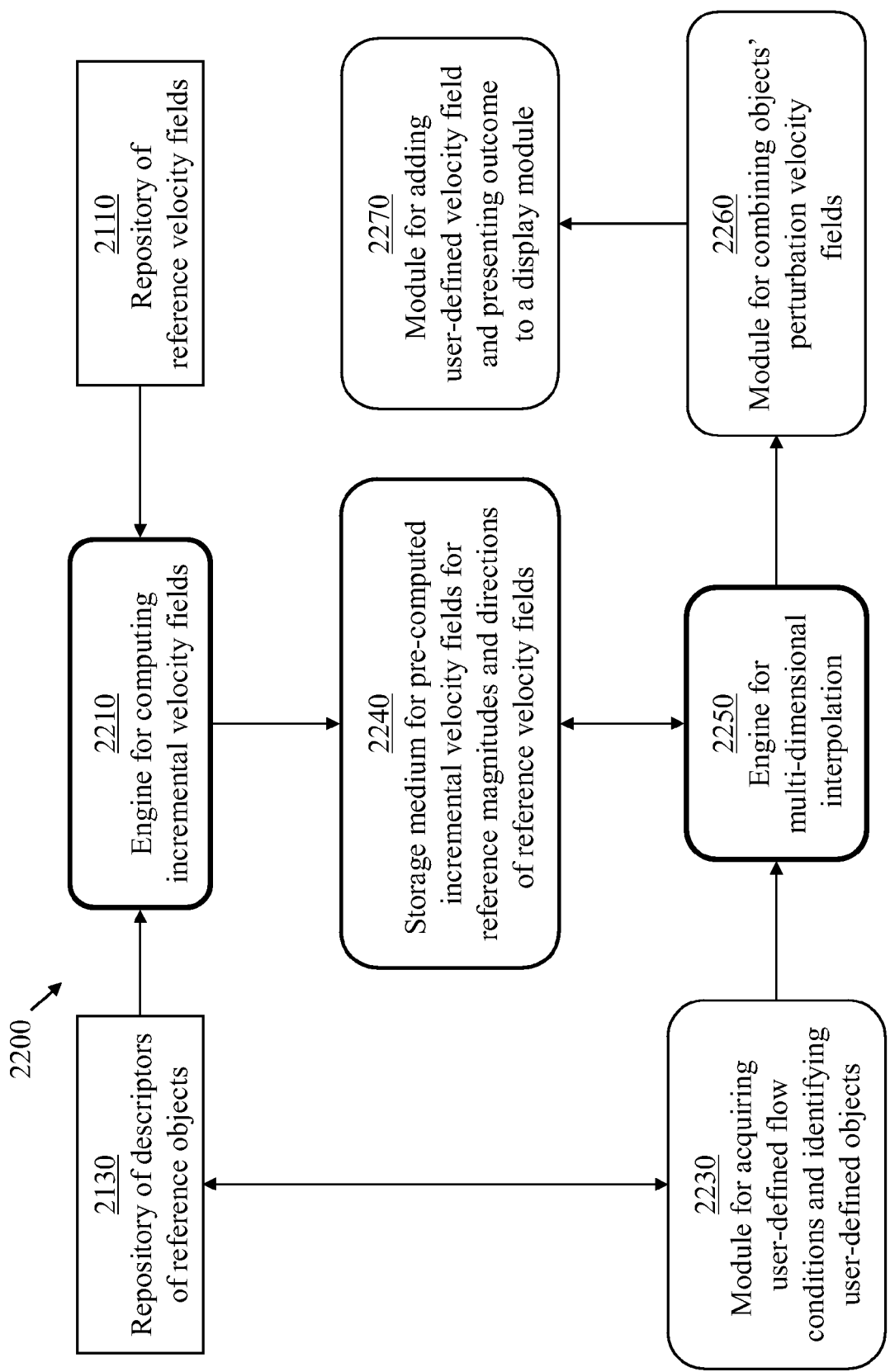
FIG. 22 illustrates an apparatus for real-time computation of perturbed velocity fields, in accordance with an embodiment of the present invention.

An apparatus 2200 for real-time computation of perturbed velocity fields for user-defined flow conditions is presented in FIG. 22. The apparatus 2200 comprises a processor (not shown), and the following components:

(1) a repository 2110 (FIG. 21) of reference velocity fields sustained within the bounded space, each reference velocity field having a respective one of specified directions;

(2) a repository 2130 (FIG. 21) of descriptors of a plurality of reference objects;

(3) a first engine 2210 for computing incremental velocity fields caused by placing an object within the bounded space—changes of velocity fields are represented by incremental velocity vectors at selected sampling points around an object;

(4) a computer readable storage medium 2240 holding pre-computed incremental velocity vectors of reference velocity fields, acquired from the repository of reference velocity fields, for several magnitudes and directions of reference velocity fields;

(5) a first module 2230 for acquiring user-defined velocity fields and descriptors of user-defined objects, and correlating a user-defined object with the reference objects;

(6) a second engine 2250 coupled to the first module 2230 and to the storage medium 2240 for computing velocity perturbation of a user-defined velocity field caused by individually placing each of user-defined objects in the bounded space;

(7) a second module 2260 for computing combined velocity perturbations of the user-defined velocity field caused by concurrent presence of user-defined objects in the bounded space;

(8) a third module 2270 for adding the user-defined velocity field to the combined velocity perturbations and presenting a resulting perturbed velocity field to a display module.

The first module 2230 also includes a conventional user interface (not illustrated in FIG. 22), having computer readable instructions stored in a computer readable storage medium, e.g., a computer memory, DVD, CD-ROM, floppy, magnetic tape or other storage medium.

The first engine 2210 comprises a computer readable storage medium, e.g., a computer memory, DVD, CD-ROM, floppy, magnetic tape or other storage medium, having computer readable instructions stored thereon for executing computer-readable instructions for solving Navier-Stokes' differential equations over an extended period of time to determine a perturbed velocity field corresponding to each of the reference velocity fields as described earlier with reference to FIG. 19. Each reference velocity field is subtracted from a corresponding perturbed velocity field to determine a differential velocity field. Temporal samples of the differential velocity field at predetermined relative time instants $t_1, t_2, \ldots, t_\nu$, $\nu \gg 1$, are recorded, thus obtaining $\nu$ temporal samples for each sampling point within the bounded space. Each of incremental velocity vectors representing changes of velocity fields is determined as a vectorial mean value of the $\nu$ temporal samples corresponding to each sampling point.

The first engine further comprises computer-readable instructions to be executed by the processor to select the specified directions of the reference velocity fields to be along mutually orthogonal axes referenced as an x-axis, a y-axis, and a z-axis, and determine Incremental velocity vectors $v^+_{s,x}, v^+_{s,y}, v^+_{s,z}, v^-_{s,x}, v^-_{s,y},$ and $v^-_{s,z}$ of reference velocity fields directed along a positive direction of the x-axis, a positive direction of the y-axis, a positive direction of the z-axis, a negative direction of the x-axis, a negative direction of the y-axis, and a negative direction of the z-axis, respectively. The incremental velocity vectors are determined for each speed value S of predefined speed values of reference velocity fields.

The second engine 2250 comprises a computer readable storage medium, e.g., a computer memory, DVD, CD-ROM, floppy, magnetic tape or other storage medium, having computer-readable instructions stored thereon for computing projections of a dimensionless unit vector, of a direction of a representative velocity vector of the user-defined velocity field, on the x-axis, y-axis, and z-axis to produce fractions $\alpha_j$, $\mu_j, \gamma_j$, where j is an index of an octant, bounded by the mutually orthogonal axes, in which the representative velocity vector is located. The velocity perturbation is determined as a function of the fractions $\alpha_j, \beta_j, \gamma_j$, and the incremental velocity vectors $v^+_{s,x}, v^+_{s,y}, v^+_{s,z}, v^-_{s,x}, v^-_{s,y},$ and $v^-_{s,z}$.

The first module 2230 comprises a computer readable storage medium, e.g., a computer memory, DVD, CD-ROM, floppy, magnetic tape or other storage medium, having computer-readable instructions stored thereon for:

(1) acquiring reference characterizing parameters of each of the reference objects from the repository 2130 of descriptors of reference objects;

(2) determining current characterizing parameters of a user-defined object according to predefined descriptors;

(3) determining a proximity metric indicating proximity of the current characterizing parameters to the reference characterizing parameters; and (4) selecting a reference object, from among the plurality of reference objects in repository 2130, which has the minimum proximity metric and presenting the selected reference object the second engine 2250 which computes velocity perturbation vectors.

Engines 2210 and 2250, modules 2230, 2260, and 2270, and repositories 2110 and 2130 of the apparatus 2200, shown in FIG. 22, comprise computer readable instructions stored in a computer readable storage medium, e.g., memory, CD-ROM, DVD, floppy, magnetic tape or other storage medium, and the apparatus 2200 further includes at least one processor for executing stored computer readable instructions to provide the functionality of the above noted modules as described in this application.

Figure 23:
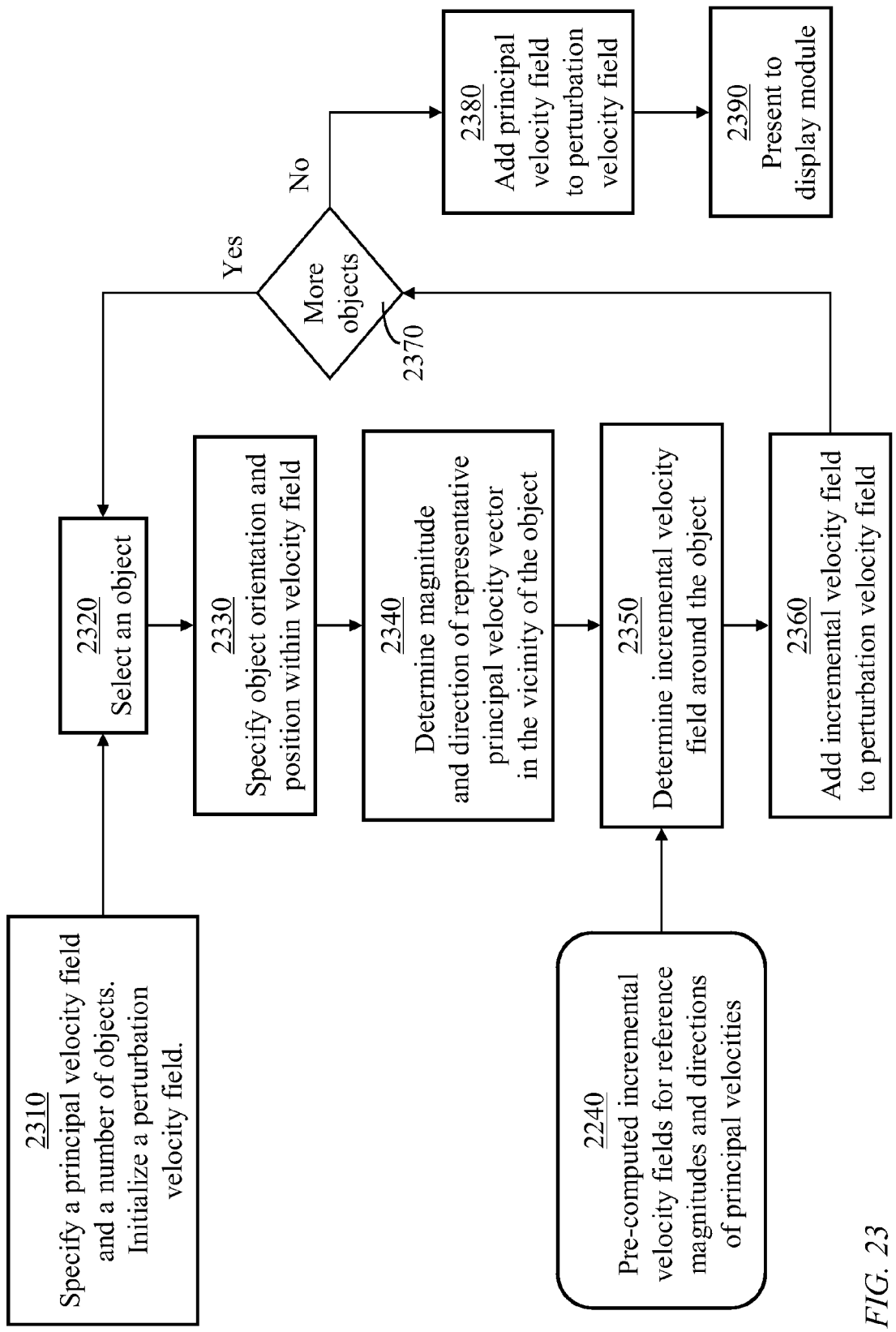
FIG. 23 illustrates a process of real-time computation of combined velocity-field perturbations in the presence of multiple objects, in accordance with an embodiment of the present invention.

FIG. 23 illustrates a process of real-time computation of combined velocity-field perturbations of a principal velocity field in a bounded space. The perturbations are caused by presence of a number of objects placed at selected positions within the bounded space. The principal velocity field is represented by velocity vectors at selected sampling points within the bounded space. In step 2310, a user selects one of the principal velocity fields stored in repository 2110 and a number of objects from among the set of objects in repository 2130. The perturbation velocity field is initialized as vectors of zero magnitude at the sampling points of the principal velocity field. In step 2320, an object is selected. In step 2330, the orientation of the object and its position within the bounded space may be specified by a user or supplied by some software module. As described above, with reference to FIGS. 5 to 16, the velocity perturbation around an object is determined according to the surrounding principal velocity vectors. Thus, in step 2340, a representative principal velocity vector is determined at the position of the object determined in step 2330. The perturbation velocity field caused by the object is determined in step 2350 using the pre-computed incremental velocity fields 2240 corresponding to specific principal velocity vectors as illustrated in FIG. 15. In step 2360, the perturbation velocity field of the current object is added to the combined perturbation field. Step 2370 either directs the process to step 2320 to consider another object or terminates the process if all objects specified in step 2310 have been considered. Step 2380 adds (vectorially) the combined perturbation field to the principal velocity field and presents the result to a display module (step 2390).

Figure 24:
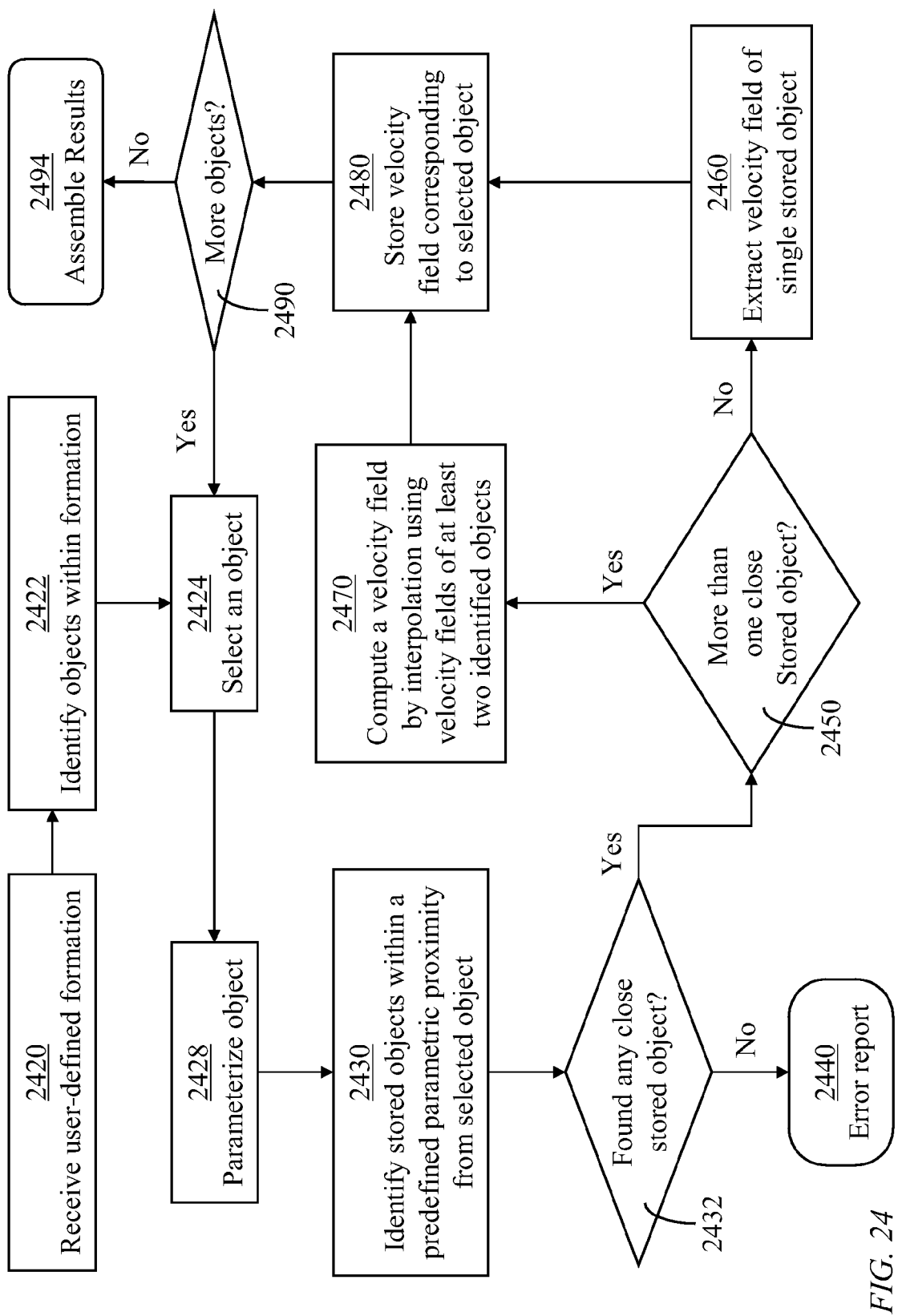
FIG. 24 illustrates a process of real-time computation of combined velocity-field perturbations in the presence of a user-defined formation of objects, in accordance with an embodiment of the present invention.

FIG. 24 is a flow chart illustrating a process of real-time computation of velocity-field perturbations caused by presence of a formation of objects defined by a user (step 2420). The principal velocity field is represented by velocity vectors at selected sampling points within the bounded space. In step 2422, objects of the formation are identified. Step 2424 selects one of the objects and step 2428 determines parameters (descriptors) characterizing the selected object. Step 2430 identifies reference objects having parameters (descriptors) close to the parameters (descriptors) of the selected object. If step 2432 determines that no reference object matches the selected object, or has parameters close to those of the selected object, the process ends in step 2440 which produces an error report. If one reference object matches the selected object (or has close parameters), step 2450 directs the process to step 2460 which extracts an incremental velocity field of the matching reference object. If two or more reference objects are in close parametric proximity to the selected object, step 2450 directs the process to step 2470 which performs an interpolation process to determine an incremental velocity field of the selected object. Step 2480 stores the incremental velocity field determined in either step 2460 or step 2470. If another object in the formation is yet to be considered, step 2490 directs the process to step 2424 which selects another object of the formation. Otherwise, step 2494 adds the incremental velocity fields of the constituent objects of the formation and presents the combined incremental velocity field to a display module.

Figure 25:
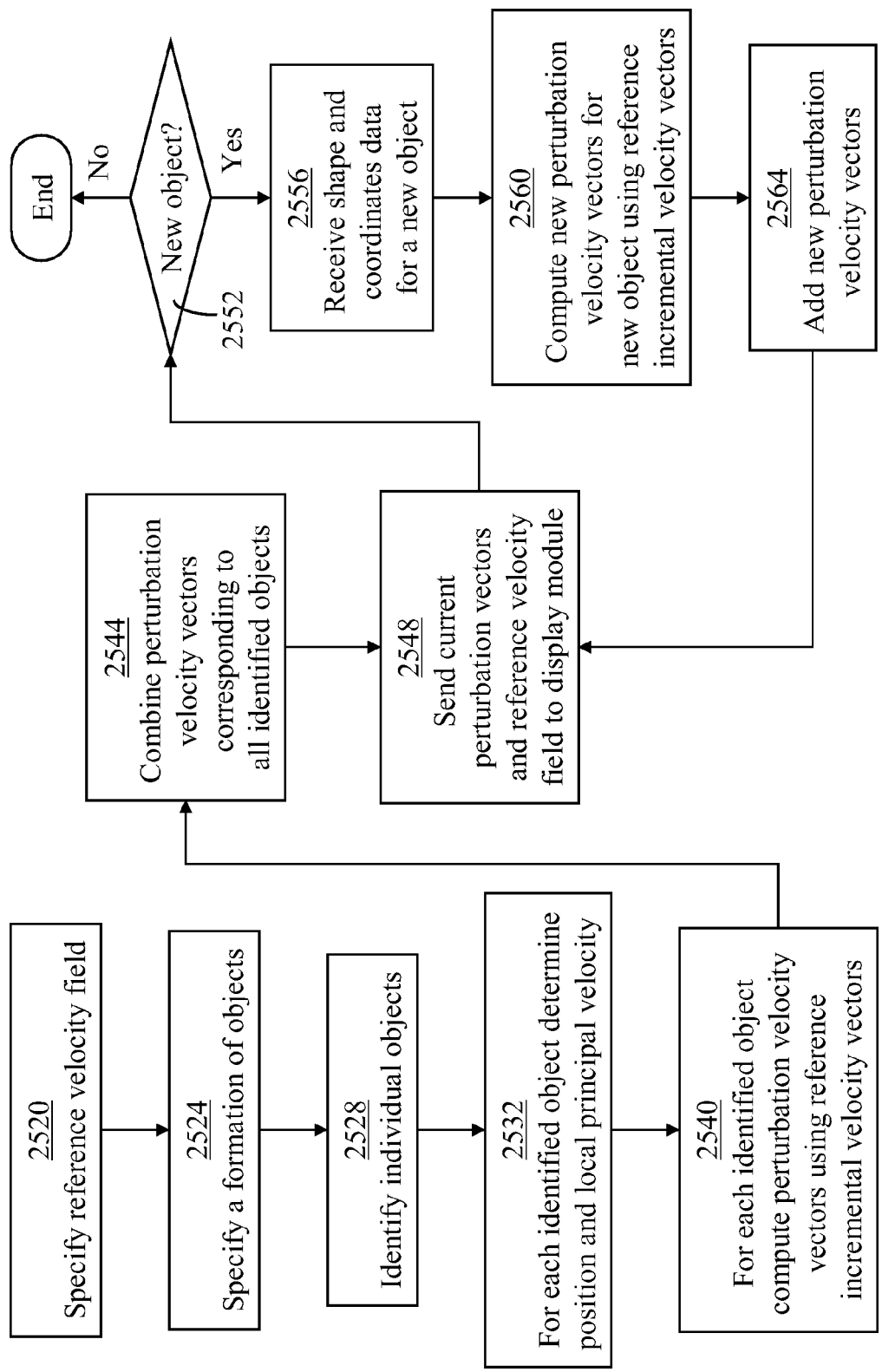
FIG. 25 is a flow chart illustrating update of a perturbed velocity field in accordance with an embodiment of the present invention.

FIG. 25 is a flow chart illustrating continued update of a velocity field with introduction of new objects. In step 2520, a user specifies a reference velocity field (step 2520) and a formation of objects forming a scene (step 2524). Individual objects of the formation are identified in step 2528. Step 2532 determines the position of each object within a bounded space sustaining the reference velocity field and a principal velocity vector representing the reference velocity field at the position. Perturbation velocity vectors at sampling points are determined for each identified object in step 2540, using the method described with reference to FIG. 5 to FIG. 16. Step 2544 combines the reference velocity field and perturbation velocity vectors of all identified objects to produce a combined velocity field which is sent to a display module (step 2548). The user may specify further objects to be placed in the bounded space. If step 2552 determines that a new object is presented, step 2556 acquires descriptors (such as shape and size) and position of the new object within the bounded space. Step 2560 computes a new perturbation velocity field (represented by new perturbation velocity vectors at sampling points) using the method described with reference to FIG. 5 to FIG. 16. The combined velocity field is updated by adding the new perturbation velocity vectors (step 2564) and sent to the display module (step 2548). The process ends when step 2552 determines that all objects introduced by the user have been considered.

Animation

In a real-time animation for example, for each frame in a scene the changes in the reference fluid velocity field of a context alone caused by one or more entities in the context are looked-up and combined with the reference fluid velocity field to obtain an overall fluid velocity field that describes fluid motion that takes into account the effects of the entities. The step of looking up changes in the fluid velocity field and their combination with the reference fluid velocity field is computationally fast making such a method well-suited for real-time applications. In some implementations, the changes in the reference fluid velocity field are pre-determined for animated entities, such as keyframe animation models commonly used in video games. In some implementations the changes in a reference velocity field caused by entities in a context take into account fluid motion modifiers such as fans, vents, grilles, and updrafts from fires, for example.

Figure 26:
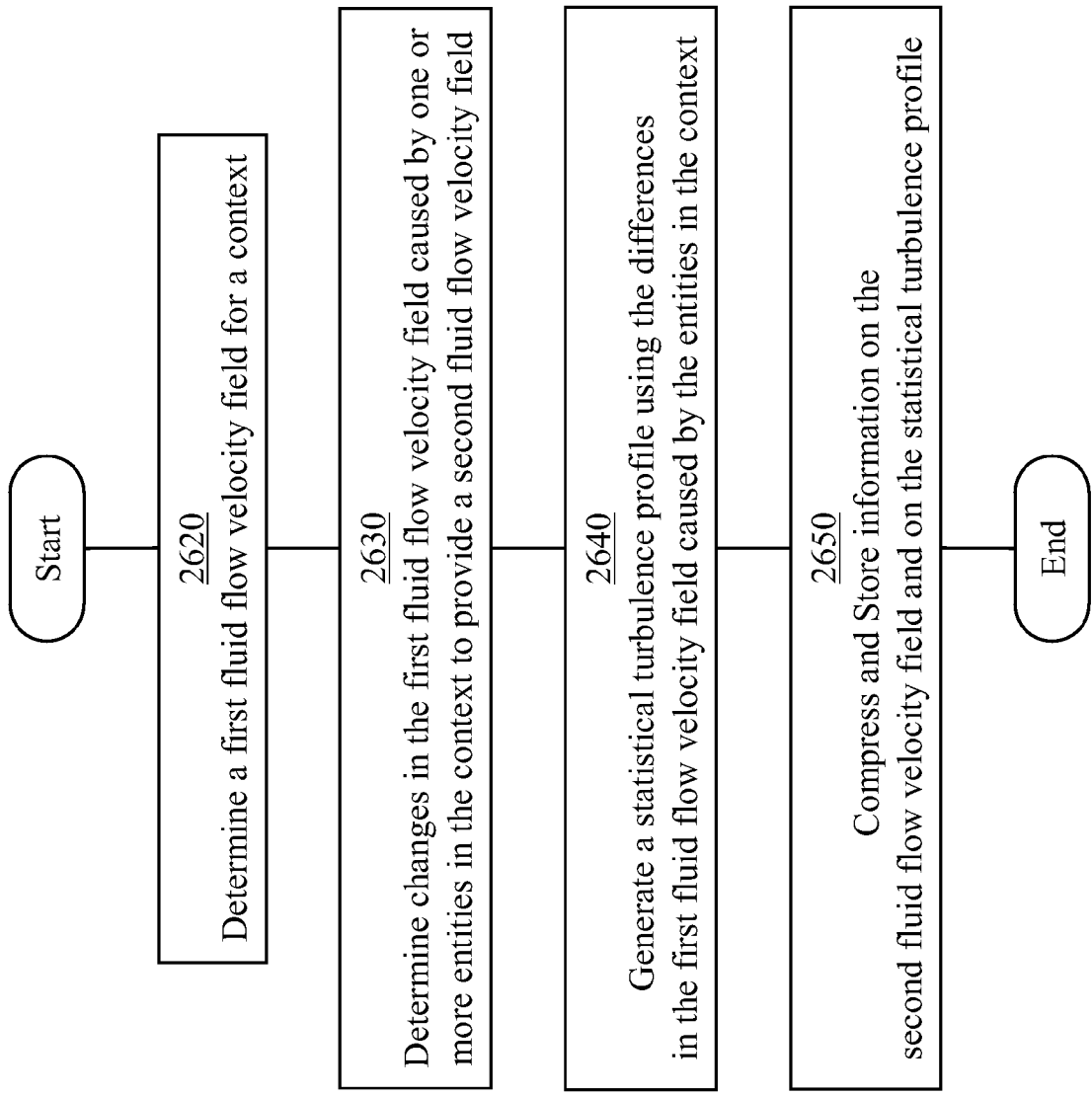
FIG. 26 is a flow chart of a method of generating information on a fluid flow for later use, in accordance with an embodiment of the invention.

Referring to FIG. 26, shown is a flow chart of a method of generating information on a fluid flow for later use, in accordance with an embodiment of the invention. A first fluid flow velocity field is determined for a context (step 2620). Changes in the first fluid flow velocity field caused by one or more entities in the context are determined to provide a second fluid flow velocity field (step 2630). A statistical turbulence profile is generated using the changes the first fluid flow velocity field caused by the entity(ies) in the context (step 2640). As will be discussed below, the statistical turbulence profile is used to model turbulence effects. This step is optional, and in some implementations turbulence is not modeled. Information on the second fluid flow velocity field and on the statistical turbulence profile is compressed and then stored (step 2650). Compression is optional, and in some implementations the information is not compressed. In some implementations, the information is stored for later use to generate fluid flow velocity fields in real-time. Furthermore, in some embodiments of the invention the information on the second fluid flow velocity field is stored only for points in space where the changes in the first fluid flow velocity field caused by the entities in the context are significant. A method of generating a fluid flow velocity field based on information on the fluid flow velocity fields with and without the entities will be described below.

Figure 27:
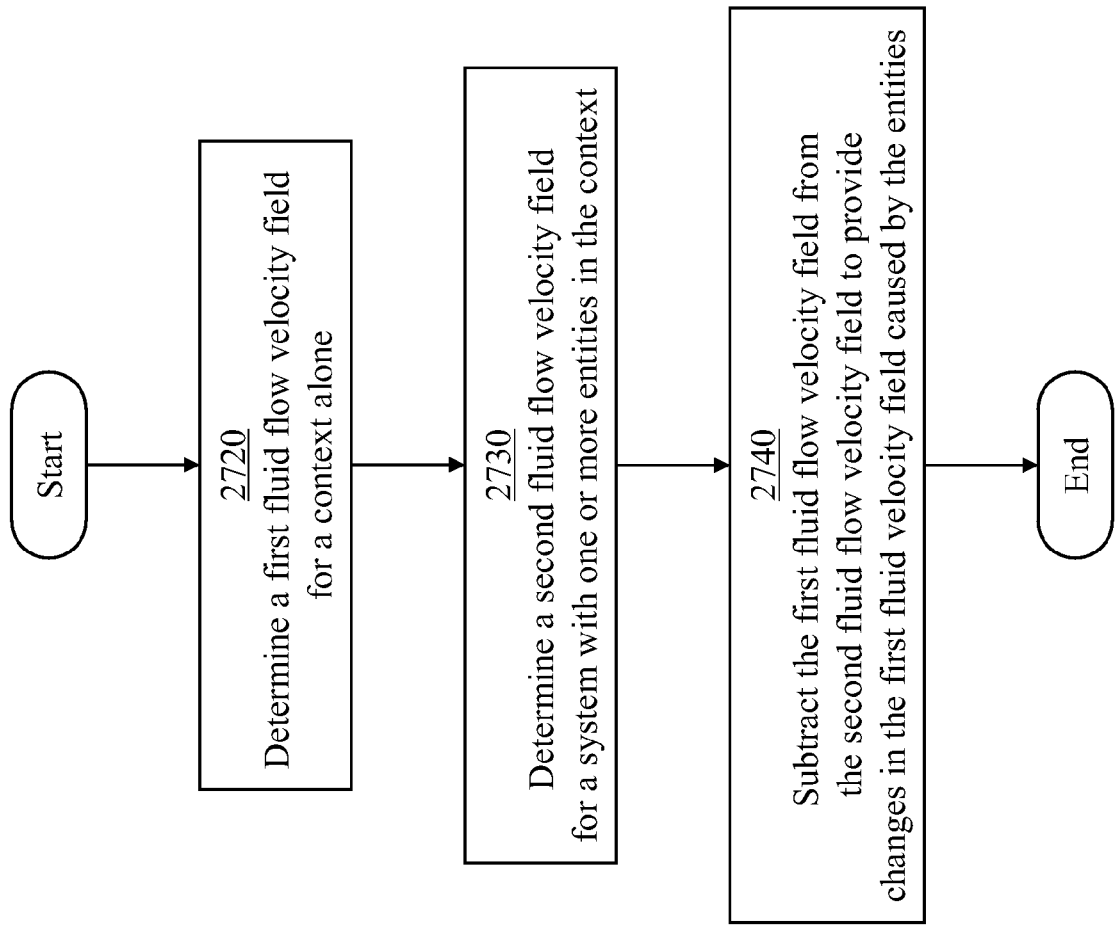
FIG. 27 is an exemplary method determining the changes in a fluid flow velocity field caused by at least one entity in a context.

Referring to FIG. 27, shown is an exemplary method determining the changes in a fluid flow velocity field caused by at least one entity in a context. In some implementations the method is used in the method of FIG. 26. A first fluid flow velocity field for the context alone is determined (step 2720). A second fluid flow velocity field is determined for a system with one or more entities in the context (step 2730). Any suitable modeling or simulation technique is used to determine the first and second fluid flow velocity fields. In a preferred embodiment a full Lagrangian simulation is used. The first fluid flow velocity field is subtracted from the second fluid flow velocity field to provide changes in the first fluid flow velocity field caused by the entities (step 2740).

Figure 28:
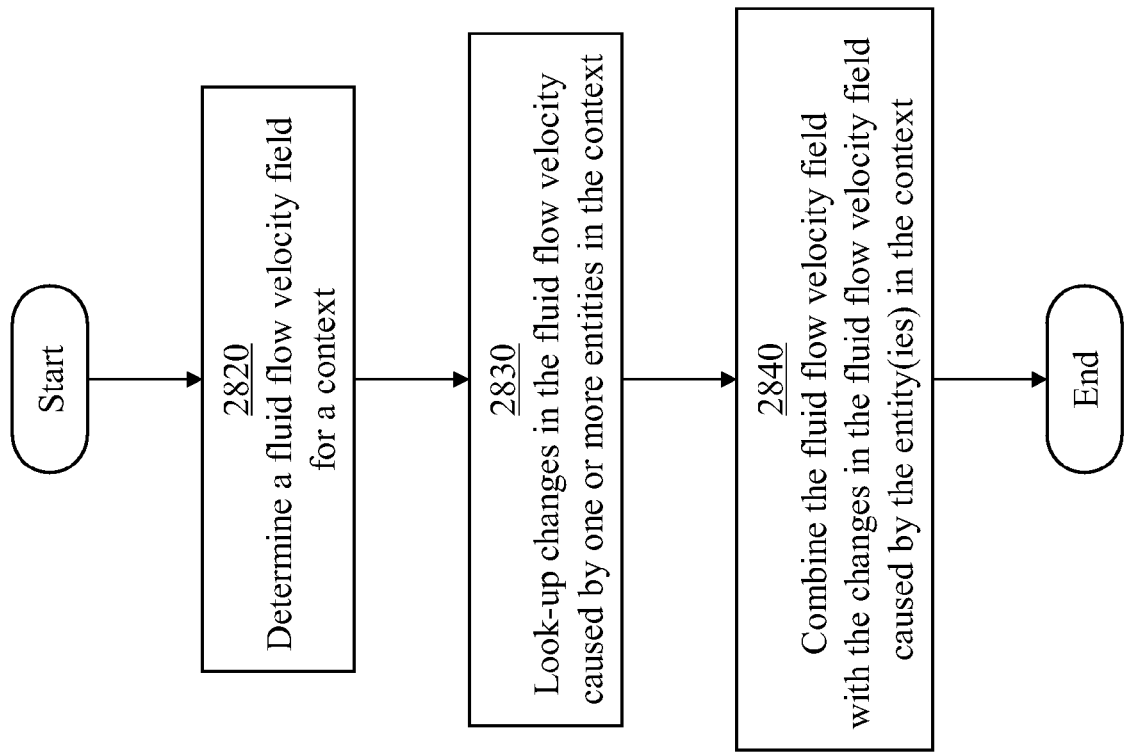
FIG. 28 is a flow chart of a method of determining a fluid flow velocity field of a fluid, in accordance another embodiment of the invention.

Referring to FIG. 28, shown is a flow chart of a method of determining a fluid flow velocity field of a fluid, in accordance another embodiment of the invention. A fluid flow velocity field in a context is determined (step 2820). Changes in the fluid flow velocity field caused by at least one entity in the context are looked up (step 2830). The fluid flow velocity field is then combined with the changes in the fluid flow velocity field caused by the entities in the context (step 2840). In some implementations the method of FIG. 28 is applied in real-time applications.

In some implementations to determine the fluid flow velocity field in a context a reference fluid velocity field for the context is looked-up from memory. The combination of the fluid flow velocity field with the changes in the fluid flow velocity field caused by the entity(ies) in the context provides a combined fluid flow velocity field.

In some embodiments of the invention, respective fluid flow velocity fields are determined for a number contexts. The respective fluid flow velocity fields are combined to provide a combined fluid flow velocity field. For example, to obtain fluid flow velocity field in a square tunnel having a car in the tunnel, a simple context such as wind flow over a plane is used as the basis for determining the fluid flow velocity field of the car on a road. In particular, the methods of FIGS. 1 and 3 are used to model a fluid flow velocity field of the car on a plane across which there is a wind flow. This fluid flow velocity field is then combined with three other fluid flow velocity fields to simulate the effects of the walls and ceiling of the tunnel. Each of the three other fluid flow velocity fields is modeled as wind flow over a plane.

Referring to FIG. 26, in some implementations the changes in the fluid flow velocity field are determined by placing the entity(ies) in its context and performing a Lagrangian fluid simulation. It is to be made clear, however, that any other suitable method of determining the fluid velocity field for the entity(ies) in the context can be used. To determine the differences, the fluid flow velocity field without the entities is subtracted from the fluid flow velocity field with the entity(ies).

To model an object such as a plane, arrow, or bird, for example the object is decomposed into a tetrahedral mesh. Similarly, surfaces of a bounding ellipsoid are also decomposed into tetrahedral meshes using a tetrahedral mesh generator such as the public-domain tetrahedral composition algorithms TetGen or Pyramid or via the method described, for example, in Labelle, F. and Shewchuk, J. R. 2007. "Isosurface stuffing: fast tetrahedral meshes with good dihedral angles" *ACM Trans. Graph.* 26, 3 (July 2007), p. 57. The tetrahedral meshes form a modeled space and fluid is advected through the modeled space using any suitable well-known algorithm, such as that described in Klingner, B. M., Feldman, B. E., Chentanez, N., O'Brien, J. F., "Fluid Animation with Dynamic Meshes" in *The Proceedings of ACM SIGGRAPH* 2006, Boston, Mass., July 30-August 3, to determine an overall fluid velocity field at different points in space. The reference velocity field is subtracted from the overall fluid velocity field to obtain changes in the fluid velocity field due to the presence of the object.

In some implementations the changes in a fluid flow velocity field caused by the entity(ies) are determined for different conditions. For example, in some implementations fluid velocity field distortions are determined for a plurality reference fluid velocity fields each having a respective speed and direction. In some implementations, other properties such as viscosity or pressure, for example, or any suitable combination thereof is varied.

In keyframe animations, an object moves in a scene under different conditions. In some implementations the changes in a fluid flow velocity field caused by one or more entities are determined for a plurality of contexts each having a respective combination of fluid flow speed and direction. This provides a discrete finite phase space for describing fluid flow under different conditions. To model keyframe animations the changes in a reference fluid flow velocity field caused by entity(ies) in a context are determined. As will be described in further detail below, for each frame, the fluid flow velocity at a particular point in space is determined by looking up a number of fluid flow velocities at different points in space and performing an interpolation to obtain the difference in the fluid flow velocity at the particular point in space caused by the object. In some implementations, information on the difference in the fluid flow velocity is compressed and stored for future use.

In some implementations when a game or simulation is running, particles are introduced and respond to the motion of a fluid. These are low mass particles that do not affect the fluid flow velocity field. There are different types of particles that are introduced in a fluid flow including: dust, smoke, snow, rain, water vapor, glowing embers, bits of glowing fire, bits of fur, and hair, for example, or other suitable particles. Other interesting particles which can be used for game purposes, for example, include invisible or barely visible bits of poisonous and/or toxic gases, biohazards, radiological hazards and other in-game modifiers. In some implementations, the particles respond to the user's behavior and to game elements' behaviors; that is, the user is able to influence the motion of particles. Since particles are intrinsically localized in space, to determine how they move in space the fluid flow velocity field is determined only where the particles are located. As such, in some implementations the fluid flow velocity field is determined only at relevant points in space thereby reducing the number of lookups required for modeling. This provides a speed-up in processing by a factor of up to 100, depending on the number of particles or relevant points in space at which the fluid flow velocity is required.

In some implementations objects or characters that are in a fluid respond to forces imparted by fluid motion. The forces exerted on the objects are determined from the fluid velocity field. The forces on the objects are used to move the objects in response to the fluid motion. For example, in an exemplary implementation an explosion and/or a gust of wind which is (are) described by an overall fluid velocity field results in explosive/wind loading forces being exerted on objects. The forces acting on the objects are determined from the fluid flow velocity field. The objects move in response to the forces and/or their movement is impeded by the forces, for example. Other examples in which wind loading forces can influence objects include but are not limited to: the flight of an arrow and/or a bullet, a bird, and a plane. The forces on the objects are determined using any suitable mechanism. For example, in some implementations any suitable buoyancy drag model is used to determine the forces on the objects. However, in some implementations, the fluid flow velocity field is used to determine loading forces on the surfaces of objects. The forces are used to determine torques on the objects, which impart rotational motion of the objects. In addition, in some implementations the fluid flow velocity field is used to provide deformations of the objects. The torques and deformations are determined using any suitable physics engine, for example.

In some implementations a fluid velocity field is also used to show local wind effects and/or provide information on local wind directions and speeds. For example, in some implementations the forces exerted on objects such as leaves, branches, and flags for example are determined by the fluid flow velocity field, and these objects respond with movements in the general direction of local fluid motion. Another example of an object's response to local fluid motion includes underwater motion in which a swimmer is dragged under the surface of a body of water by undertow. In some implementations, sinkholes and/or vortices are used to change the paths of ships and/or swimming creatures.

In most cases the effects of an entity in a context causes only local effects on a reference fluid flow velocity field. For example, in laminar flow the presence of an object causes local changes in a reference fluid flow velocity field. These local changes decrease with increasing distance. In non-laminar flow, the presence of an object in the non-laminar flow can cause local turbulence effects, which influence the fluid flow downstream. In both cases the changes in the fluid flow velocity field are localized to an area in space, which can be described by a bounding ellipsoid. In some implementations the localized nature of the changes in the fluid flow velocity field is used to improve the performance of fluid flow simulations. Such an exemplary implementation will now be discussed with reference to FIG. 29.

Figure 29:
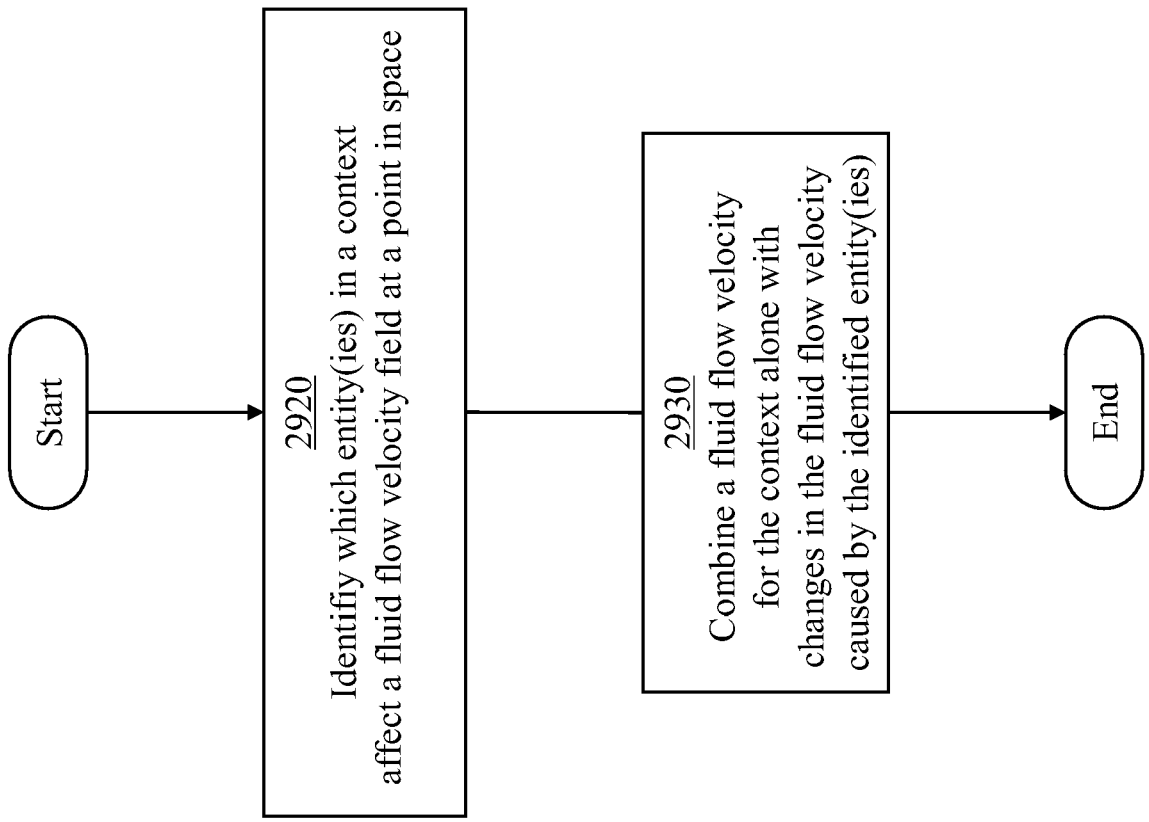
FIG. 29 is a flow chart of an exemplary method of performing a look-up step in the method of FIG. 28.

Referring to FIG. 29, shown is a flow chart of an exemplary method of performing the look-up step of the method of FIG. 28. To determine the fluid velocity at a point in space entities in a context which affect the fluid velocity field at the point in space are identified (step 2920). In particular, each entity has associated with it a bounding box that defines the spatial extent of the fluid velocity field distortions caused by the object. In particular, an object is identified as affecting the fluid velocity field when its respective bounding box overlaps the point in space at which fluid velocity is to be determined. Any suitable method, such the well-known octree-based bounding box lookup method, can be used to determine which bounding boxes overlap the point in space. A fluid flow velocity for the context alone and a change in the fluid flow velocity caused by the identified entity(ies) are then combined to provide a combined fluid velocity at the point (step 2930).

In real-time applications, in some instances an object will move along a fluid flow and the motion of the object is determined by the forces applied to the object. These forces are determined by doing a look-up of stored changes in a fluid flow velocity field caused by the object in a context and determining an overall fluid flow velocity field. However, in most cases the position of the object does not correspond to any of the discrete set of points at which information on fluid flow velocities are maintained. As such, in some implementations an interpolation is performed to provide fluid flow velocities at any point in space. In particular, a particular fluid flow velocity at a point in space is determined using fluid flow velocities at points in space which are nearest neighbors to the point in space at which the fluid flow velocity is to be determined. The interpolation depends on the position of the point in space relative to its nearest neighbor. The weight carried by a nearest neighbor increases with decreasing distance from the point in space at which the fluid flow velocity is to be determined. Such an interpolation is done using any suitable interpolation algorithm. In a preferred embodiment a multi-linear interpolation is performed to provide efficiency.

As discussed above, in some embodiments of the invention turbulence is modeled. At low speeds a flow along a boundary is smooth. Such a fluid flow is called a laminar flow. However, at higher fluid velocities there can be turbulence. Turbulence is difficult to handle computationally, and physical properties of turbulence are highly sensitive to initial conditions. In some implementations, a simplification to an exact mathematical description of the dynamics of fluid flow is implemented while preserving realistic visual effects of turbulent flow. In particular, for example in some implementations vortex elements, which each represent a discrete, spatially localized quantity of vorticity, are introduced. Each vortex element has a fixed speed and size associated with it. The local curl at a point in space in a flow is described by a normal curl of the laminar fluid motion plus the sum of the curls of each vortex element that has any effect at the point in space. Vortex elements are moved around with fluid motion in successive frames using a form of the Navier-Stokes equations that explicitly represent vorticity. In particular, Navier-Stokes equations are applied. For incompressible flows these equations can be expressed by the equation $$\frac{\partial \vec{v}}{\partial t} + (\vec{v} \cdot \nabla)\vec{v} + \frac{\nabla p}{\rho} = \mu \nabla^2 \vec{v} + \vec{f},$$

where $\vec{v}$ is the velocity, p is the pressure, $\rho$ is the fluid density, $\mu$ is the fluid viscosity, and $\vec{f}$ is an externally applied force. Taking the curl $\nabla \times \bullet$ of each term of this equation transforms this equation in a form for advecting vortices, namely $$\frac{\partial \vec{\omega}}{\partial t} + (\vec{v} \cdot \nabla)\vec{\omega} - (\vec{\omega} \cdot \nabla)\vec{v} = \mu \nabla^2 \vec{\omega} + \nabla \times \vec{f},$$

where $\vec{\omega}$ is the curl of the fluid flow velocity field at each point. A discrete version of this equation is used with a finite time step to determine the new position of a vortex element at the next time step. Advantageously, this method allows vortex elements be quickly advected around an area in space by performing fluid velocity queries at points in space.

In some implementations turbulence is generated by fluid moving across in-scene objects as well as by fluid flowing around walls and corners in a modeled space. As discussed above, during object profiling, several conditions with different velocities are modeled. For low-speed conditions fluid flow is laminar. However, for higher speeds there is turbulence. A method of generating a statistical turbulence profile for later use in a real-time application will now be described with reference to FIG. 30. In some embodiments of the invention the method of FIG. 30 is used for statistical turbulence profile generation in the method of FIG. 26.

Figure 30:
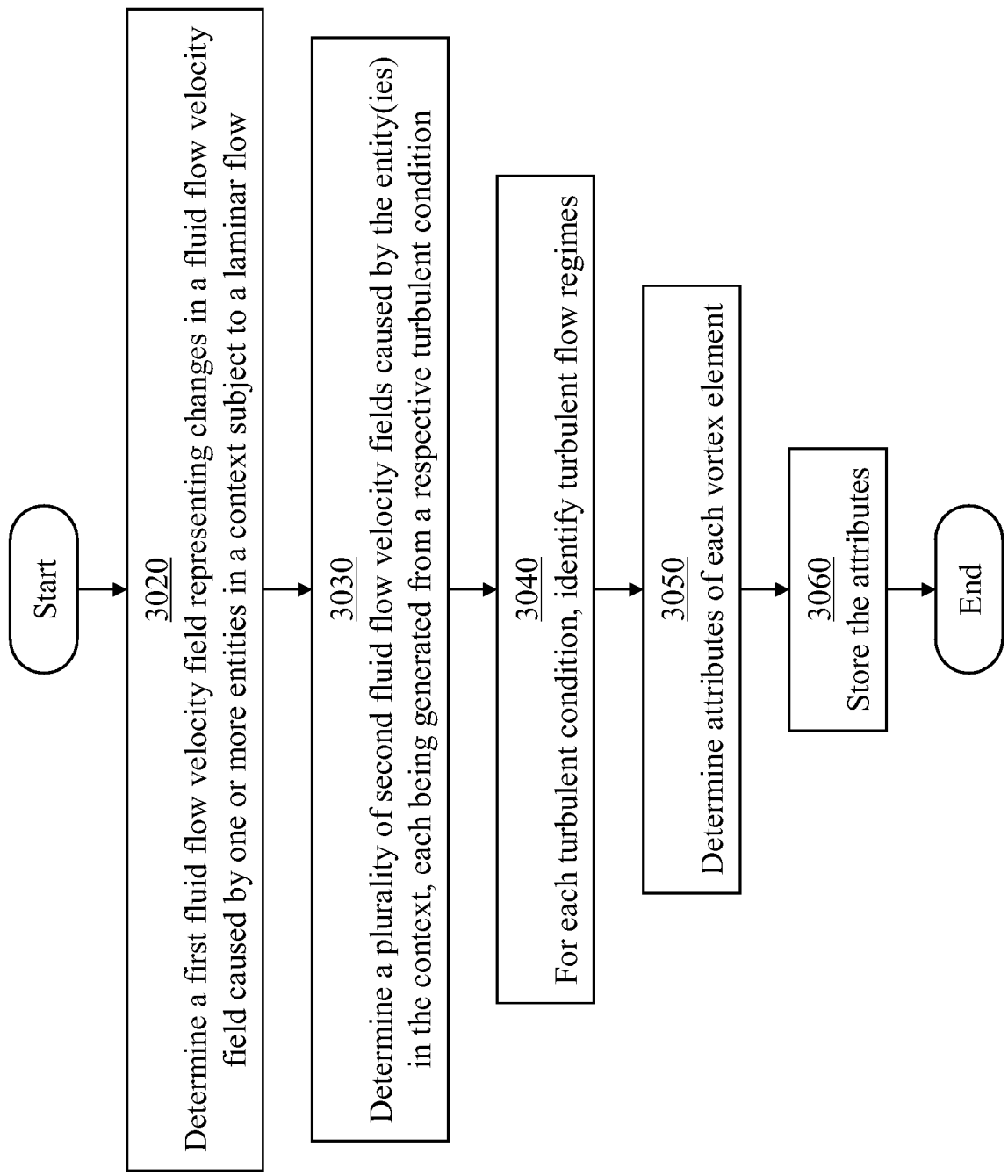
FIG. 30 is a flow chart of a method of generating a statistical turbulence profile in the method of FIG. 26.

In FIG. 30, a first fluid flow velocity field representing changes in a fluid flow velocity field caused by one or more entities in a context is determined (step 3020) for a laminar condition (i.e., low speed fluid flow). A plurality of second fluid flow velocity fields representing changes in fluid flow velocity fields caused by the entity(ies) in the context are determined for a plurality of turbulent conditions (step 3030). For each turbulent condition, turbulent flow regions are identified (step 3040). In an exemplary implementation, the turbulent flow regions are identified from a curl operation at different points in space, which is given by $\nabla \times (\vec{V}_l - \vec{V}_t)$, where $\vec{V}_l$ is the fluid flow velocity at a particular point obtained from the simulation with laminar conditions and $\vec{V}_t$ is the fluid flow velocity at the particular point obtained from a particular simulation with turbulent conditions. Attributes for each identified vortex element are determined (step 3050). The attributes include, but are not limited to, size and rotational speed of the vortex elements. In some implementations these attributes are estimates of the actual attributes of the vortex elements. The attributes are then stored for later use (step 3060). In particular, the attributes of vortex elements generated from different turbulence conditions collectively provide a statistical turbulence profile which, as will now be described below, is used to generate turbulence in real-time applications.

To limit the number of the vortex particles, a mechanism is used for eliminating vortex elements when they are no longer useful. Two processes that occur in nature which are of use in this regard are vortex merging and dissipation. In some implementations vortex elements dissipate and/or are merged together.

Figure 31:
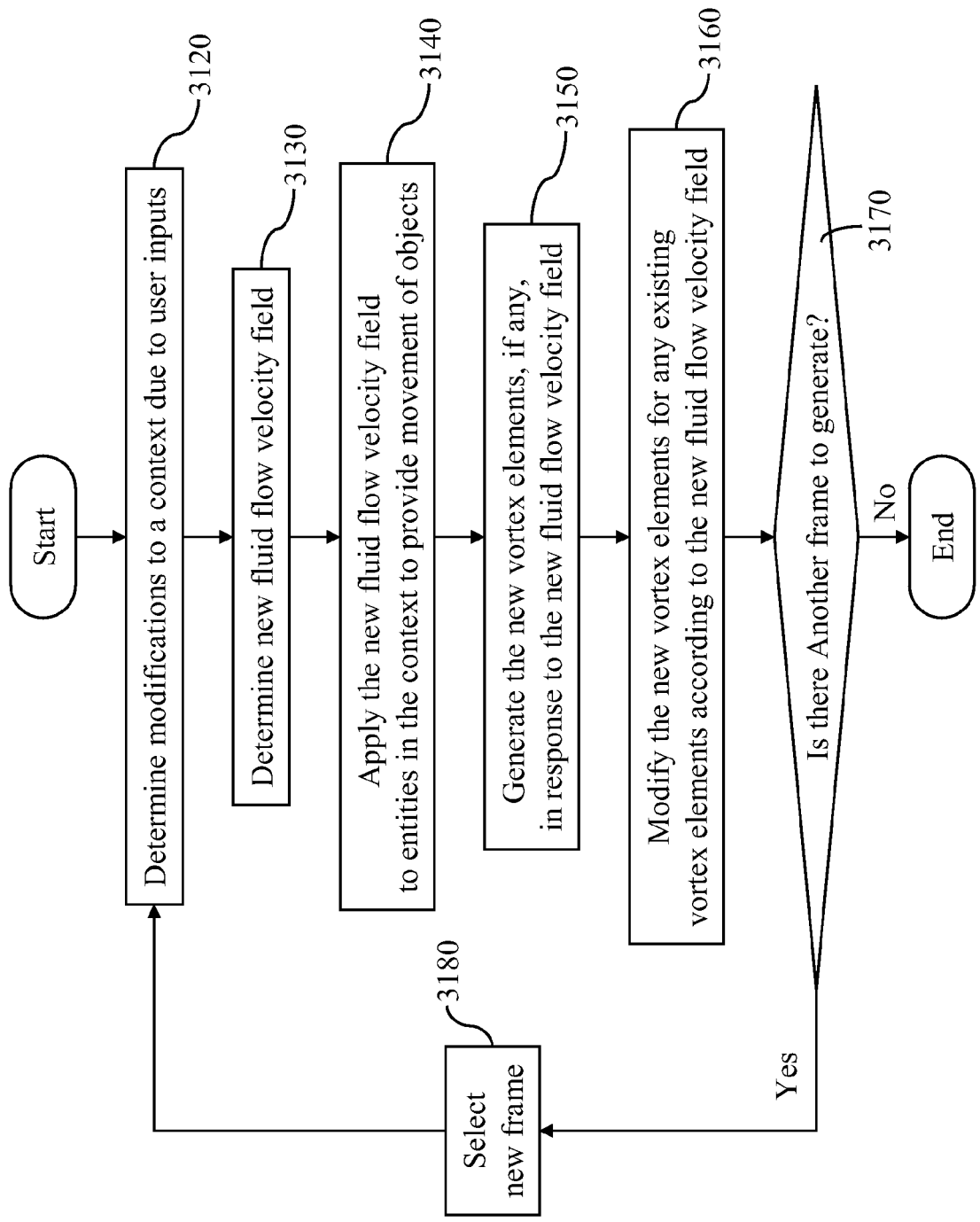
FIG. 31 is a flow chart of a method of generating a sequence of frames, in accordance with another embodiment of the invention.

Referring to FIG. 31, shown is a method of generating a sequence of frames, in accordance with another embodiment of the invention. Modifications to a context due to user inputs are determined at a first step (step 3120). The modifications include for example, an explosion and introduction one or more additional objects or other entities into to the context. Another example involves moving an object in response to a user input. A new fluid flow velocity field is then determined (step 3130) for existing entities and for the additional entities in the context. In some implementations, the method of FIG. 28 is used to perform this step. The new fluid flow velocity field is applied to objects, characters, and/or other entities (step 3140) to provide movement or any other suitable visual effect. New vortex elements are generated (step 3150) in response to the application of the new fluid flow velocity field using a look-up of statistical turbulence profiles. The new vortex elements and any existing vortex elements are modified according to the new fluid flow velocity field (step 3160). For example, in some implementations the modifications include modifying the life cycle of vortex elements by moving the vortex elements, changing their size and speed, and dissipating the vortex elements. The method ends if step 3170 determines that there is no other frame to generate. Otherwise, a next frame is selected (step 3180) and the method steps 3120 to 3160 are repeated.

Figure 32:
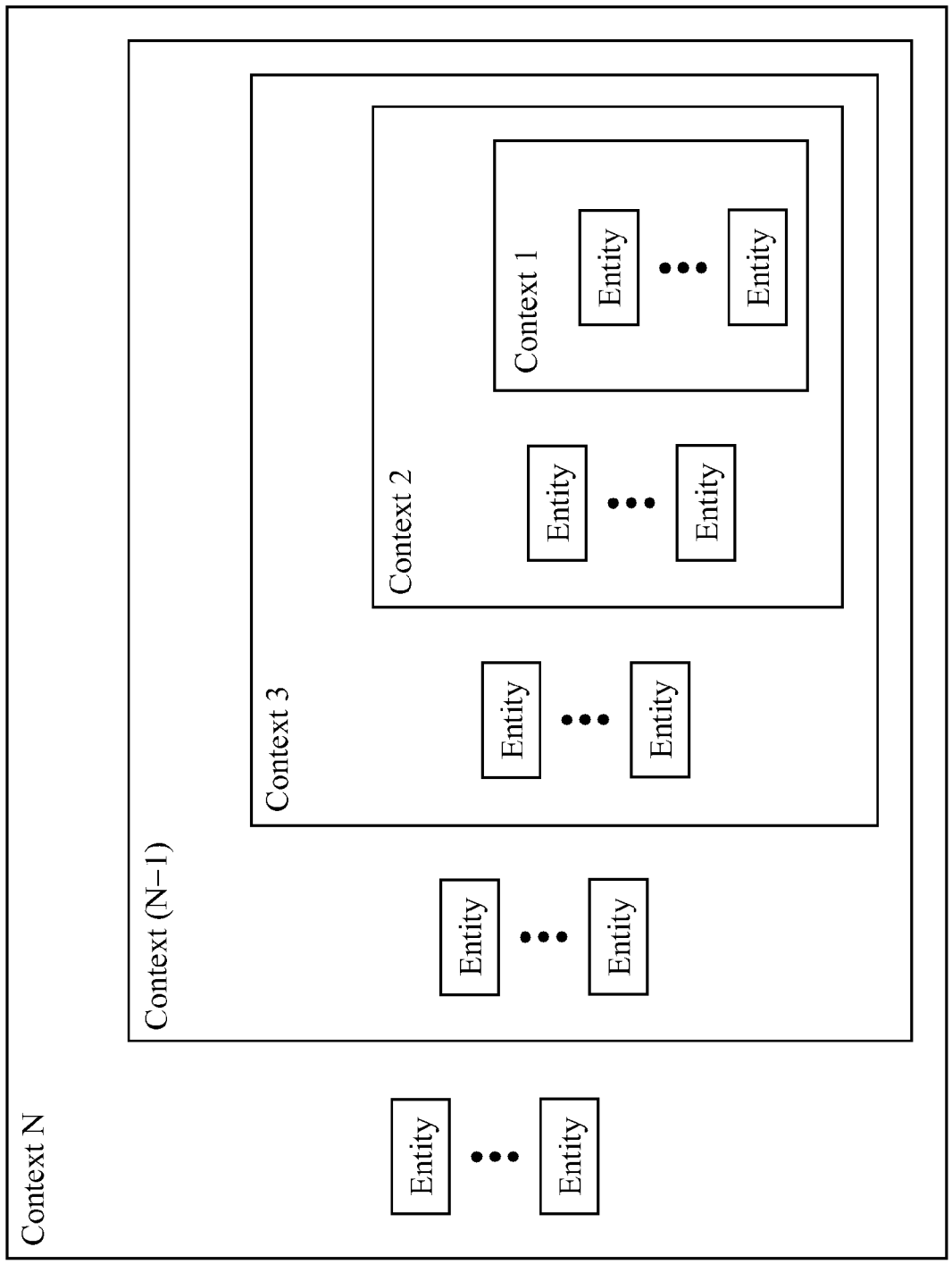
FIG. 32 a block diagram of contexts interlaid within one another to illustrate how the method of FIG. 26 is used recursively to model complex systems.

As discussed above, a fluid flow velocity field is determined for one or more entities in a context, and changes in a reference fluid velocity field caused by the entities are determined and saved for later use in real-time rendering applications. In some embodiments of the invention a system with one or more entities in a first context define a second context. This second context is used to form the basis for adding the effects of additional entities in a system. For example, a field can serve as a context for modeling a system having a house in the field. In that case changes in the wind velocity field caused by the presence of the house in the field are determined and information on the changes is stored for later use. The changes in the fluid flow velocity field caused by the house are determined using the fluid flow velocity field with the house in its context (the field). This fluid flow velocity field is then used to model fluid flow in a system having a car in a context comprising the house in the field. In that case, changes in the fluid flow velocity field caused by the presence of the car are determined from fluid flow velocity fields with and without the car. In this way, fluid flow velocity fields are rendered in a recursive way to model complex systems. An arrangement of contexts for implementing such a recursive method is shown in FIG. 32. In FIG. 32, a context 1 and a plurality of entities form the basis of a context 2. The context 2 and another plurality of entities form the basis for a context 3. More generally, each context includes one or more entities and a previously defined context. To generate fluid flow velocity fields, the method of FIG. 28 is applied recursively to any one or more of the contexts of FIG. 32 together with their respective entities.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method for determining and displaying fluid flow in a bounded space, comprising:
  employing at least one processor for:
    defining a set of reference velocity fields sustained within said bounded space, each reference velocity field having a respective one of specified directions;
    determining a set of incremental velocity fields corresponding to said reference velocity fields, for each of a number of predefined speed values of said reference velocity fields, caused by placing an object within said bounded space;
    inducing a specified velocity field within said bounded space;
    determining perturbation of said specified velocity field, caused by placing said object at a specific position within said bounded space, by performing an interpolation process based on said reference velocity fields, said set of incremental velocity fields, and a representative velocity vector of said specified velocity field at said specific position;
    representing each said incremental velocity field by incremental velocity vectors at each sampling point of a plurality of sampling points within said bounded space;
    determining said incremental velocity vectors at each of said sampling points and retaining only each incremental velocity vectors having a magnitude exceeding a predefined threshold; and
    presenting said specified velocity field and said perturbation of said specified velocity to a display module.

2. The method of claim 1, further comprising selecting said sampling points within an enclosure surrounding said object, said enclosure selected so that each incremental velocity field in said set of incremental velocity fields has a negligible magnitude outside said enclosure.

3. The method of claim 2, wherein said enclosure is of an ellipsoidal form.

4. The method of claim 1, further comprising:
  specifying traversed sampling points, from among said plurality of sampling points, which a mobile object traverses at specified instants of time;
  determining background velocity vectors of said specified velocity field at said traversed sampling points;
  determining propagating perturbations of said background velocity vectors caused by presence of said mobile object at said traversed sampling points by performing interpolation processes based on said reference velocity fields, said set of incremental velocity fields, and said background velocity vectors; and
  presenting said background velocity vectors and said propagating perturbations to said display module.

5. The method of claim 4, further comprising specifying rotations of said mobile object at said specified instants of time and adjusting said background velocity vectors, relative to said mobile object, according to respective angles of rotation.

6. The method of claim 1, wherein the step determining said set of incremental velocity fields further comprises:
  solving Navier-Stokes differential equation over an extended period of time to determine a perturbed velocity field corresponding to each of said reference velocity fields;
  subtracting each said reference velocity field from a corresponding perturbed velocity field to determine a differential velocity field;

recording temporal samples of said differential velocity field at predetermined relative time instants $t_1, t_2, \ldots, t_\nu$, $\nu \gg 1$, to produce $\nu$ temporal samples for each of said sampling points within said bounded space;

determining said incremental velocity vector at each sampling point as a vectorial mean value of said $\nu$ temporal samples corresponding to said each sampling point.

7. A method for determining and displaying fluid flow in a bounded space, comprising:
employing at least one processor for:
defining a set of reference velocity fields sustained within said bounded space, each reference velocity field having a respective one of specified directions;
determining a set of incremental velocity fields corresponding to said reference velocity fields, for each of a number of predefined speed values of said reference velocity fields, caused by placing an object within said bounded space;
inducing a specified velocity field within said bounded space;
determining perturbation of said specified velocity field, caused by placing said object at a specific position within said bounded space, by performing an interpolation process based on said reference velocity fields, said set of incremental velocity fields, and a representative velocity vector of said specified velocity field at said specific position;
representing each said incremental velocity field by incremental velocity vectors at each sampling point of a plurality of sampling points within said bounded space;
presenting said specified velocity field and said perturbation of said specified velocity to a display module;
the method further comprising:
defining mutually orthogonal axes referenced as an x-axis, a y-axis, and a z-axis;
selecting said specified directions to be along said mutually orthogonal axes;
determining, for each speed value S of said predefined speed values, corresponding incremental velocity vectors $v^+_{s,x}, v^+_{s,y}, v^+_{s,z}, v^-_{s,x}, v^-_{s,y}$, and $v^-_{s,z}$, where:
$v^+_{s,x}$ is an incremental velocity vector corresponding to a reference velocity field along a positive direction of said x-axis;
$v^+_{s,y}$ is an incremental velocity vector corresponding to a reference velocity field along a positive direction of said y-axis;
$v^+_{s,z}$ is an incremental velocity vector corresponding to a reference velocity field along a positive direction of said z-axis;
$v^-_{s,x}$ is an incremental velocity vector corresponding to a reference velocity field along a negative direction of said x-axis;
$v^-_{s,y}$ is an incremental velocity vector corresponding to a reference velocity field along a negative direction of said y-axis;
$v^-_{s,z}$ is an incremental velocity vector corresponding to a reference velocity field along a negative direction of said z-axis;
and
storing said incremental velocity vectors, for each of said predefined speed values, in a non-transitory computer readable storage medium;
method further comprising determining said incremental velocity vectors $v^+_{h,x}, v^+_{h,y}, v^+_{h,z}, v^-_{h,x}, v^-_{h,y}$, and $v^-_{h,z}$, corresponding to a speed value h not included in said predefined speed values, $p < h < q$, where p and q denote speed values included in said predefined speed values, according to interpolation approximations:

$$v^+_{h,x} = (1-\delta)v^+_{p,x} + \delta v^+_{q,x};$$

$$v^+_{h,y} = (1-\delta)v^+_{p,y} + \delta v^+_{q,y};$$

$$v^+_{h,z} = (1-\delta)v^+_{p,z} + \delta v^+_{q,z};$$

$$v^-_{h,x} = (1-\delta)v^-_{p,x} + \delta v^-_{q,x};$$

$$v^-_{h,x} = (1-\delta)v^-_{p,y} + \delta v^-_{q,y};$$

$$v^-_{h,x} = (1-\delta)v^-_{p,z} + \delta v^-_{q,z};$$

where $\delta = (\log h - \log p)/(\log q - \log p)$, the term log denoting logarithm of a finite number for any finite base, incremental velocity vectors $v^+_{p,x}, v^+_{p,y}, v^+_{p,z}, v^-_{p,x}, v^-_{p,y}$, and $v^-_{p,z}$, correspond to a speed value p, and incremental velocity vectors $v^+_{q,x}, v^+_{q,y}, v^+_{q,z}, v^-_{q,x}, v^-_{q,y}$, and $v^-_{q,z}$, correspond to a speed value q.

8. The method of claim 7, further comprising:
representing said perturbation of said specified velocity field by perturbation vectors at said sampling points;
locating said representative velocity vector within one of eight octants defined by said mutually orthogonal axes, said eight octants identified by indices 0 to 7;
projecting a dimensionless unit vector of a direction of said representative velocity vector on said x-axis, y-axis, and z-axis to produce fractions $\alpha_j, \beta_j, \gamma_j$, where j is an index of an octant in which said representative velocity is located;
and
performing said interpolation process according to expressions:

$$\lambda_0 = \alpha_0 v^+_{s,x} + \beta_0 v^+_{s,y} + \gamma_0 v^+_{s,z};$$

$$\lambda_1 = \alpha_1 v^-_{s,x} + \beta_1 v^+_{s,y} + \gamma_1 v^+_{s,z};$$

$$\lambda_2 = \alpha_2 v^+_{s,x} + \beta_2 v^-_{s,y} + \gamma_2 v^+_{s,z};$$

$$\lambda_3 = \alpha_3 v^-_{s,x} + \beta_3 v^-_{s,y} + \gamma_3 v^+_{s,z};$$

$$\lambda_4 = \alpha_4 v^+_{s,x} + \beta_4 v^+_{s,y} + \gamma_4 v^-_{s,z};$$

$$\lambda_5 = \alpha_5 v^-_{s,x} + \beta_5 v^+_{s,y} + \gamma_5 v^-_{s,z};$$

$$\lambda_6 = \alpha_6 v^+_{s,x} + \beta_6 v^-_{s,y} + \gamma_6 v^-_{s,z}; \text{ and}$$

$$\lambda_7 = \alpha_7 v^-_{s,x} + \beta_7 v^-_{s,y} + \gamma_7 v^-_{s,z};$$

where $\lambda_j$ is an interpolated perturbation vector located in octant j, $0 \leq j < 8$, for a representative velocity vector of speed S.

9. A method for determining and displaying fluid flow in a bounded space, comprising:
employing at least one processor for:
defining a reference velocity field, of a specified direction, sustained within said bounded space;
specifying individual identifiers of a set of reference objects;
determining a set of incremental velocity fields, caused by exclusively placing each reference object within said bounded space, for a number of object orientations relative to said specified direction and a number of predefined speed values of said reference velocity field;

storing, in a non-transitory computer readable storage medium, reference information including said object orientations and incremental velocity fields relevant to each reference object;

specifying:
- a current velocity field within said bounded space;
- a first identifier of a first object;
- position of said first object within said bounded space; and
- an indication of orientation of said first object;

determining a first velocity vector in said current velocity field at said position;

associating said first object with a matching object from among said set of reference objects according to said first identifier and said individual identifiers of said set of reference objects;

determining a first perturbation field of said current velocity field, caused by said first object, according to said first velocity vector, said orientation of said first object, and said reference information relevant to said matching object;

representing each said incremental velocity field by incremental velocity vectors at each sampling point of a plurality of sampling points within said bounded space; and determining said incremental velocity vectors at each of said sampling points and retaining only each incremental velocity vectors having a magnitude exceeding a predefined threshold; and presenting said current velocity field and said first perturbation field to a display module.

10. The method of claim 9, further comprising setting said individual identifiers as indices, setting said identifier of said first object as a first index, and selecting said matching reference object according to said first index.

11. The method of claim 9, further comprising:
characterizing each of said reference objects according to descriptors of physical attributes;
characterizing said first object according to said descriptors of physical attributes; and
selecting said matching object according to proximity of descriptors of said first object to descriptors of each reference object.

12. The method of claim 9, further comprising:
specifying:
- a second identifier of a second object;
- a second velocity vector in said current velocity field at a position of said second object; and
- an indication of orientation of said second object;

selecting a new matching object from among said set of reference objects according to said second identifier and said individual identifiers of said set of reference objects;

determining a second perturbation field of said current velocity field, caused by said second object, according to said second velocity vector, said orientation of said second object, and said reference information relevant to said new matching object;

summation of said first perturbation field and said second perturbation field to produce a combined perturbation field; and presenting said current velocity field and said combined perturbation field to the display module.

13. An apparatus for determining and displaying fluid flow in a bounded space, comprising:
a processor;
a repository of reference velocity fields sustained within said bounded space, each reference velocity field having a respective one of specified directions;
a repository of descriptors of a plurality of reference objects;
a first engine for computing variation of velocity fields caused by placing an object within said bounded space;
a non-transitory computer readable storage medium for storing incremental velocity vectors representing said variation of velocity fields;
a first module for acquiring user-defined velocity fields and descriptors of user-defined objects, and correlating a user-defined object with said reference objects;
a second engine operatively coupled to said first module and said storage medium for computing velocity perturbation of a user-defined velocity field caused by individually placing each of at least one user-defined object in said bounded space;
a second module for computing combined velocity perturbations of said user-defined velocity field caused by concurrent presence of said at least one user-defined object in said bounded space; and
a third module for adding said user-defined velocity field to said combined velocity perturbations and presenting a resulting perturbed velocity field to a display module;
wherein the first and second engines, the first, second and third modules, the repository of reference velocity fields, and the repository of descriptors comprise a non-transitory computer readable storage medium having computer readable instructions stored thereon for execution by the processor.

14. The apparatus of claim 13, wherein said first engine comprises a non-transitory computer readable storage medium having computer-readable instructions stored thereon, which, when executed, cause said first engine to:
solve Navier-Stokes' differential equations over an extended period of time to determine a perturbed velocity field corresponding to each of said reference velocity fields;
subtract each said reference velocity field from a corresponding perturbed velocity field to determine a differential velocity field;
record temporal samples of said differential velocity field at predetermined relative time instants $t_1, t_2, \ldots, t_\nu$, $\nu \gg 1$, to collect $\nu$ temporal samples for each sampling point of a plurality of sampling points within said bounded space; and
determine each of the incremental velocity vectors representing said variations of velocity fields as a vectorial mean value of said $\nu$ temporal samples corresponding to said each sampling point.

15. The apparatus of claim 14, wherein the first engine further comprises a non-transitory computer readable storage medium having computer-readable instructions stored thereon, which, when executed, cause said first engine to:
select said specified directions to be along mutually orthogonal axes referenced as an x-axis, a y-axis, and a z-axis; and
determine, for each speed value S of predefined speed values of reference velocity fields along a positive direction of the x-axis, a positive direction of the y-axis, a positive direction of the z-axis, a negative direction of the x-axis, a negative direction of the y-axis, and a negative direction of the z-axis, corresponding incremental velocity vectors $v^+_{s,x}, v^+_{s,y}, v^+_{s,z}, v^-_{s,x}, v^-_{s,y},$ and $v^-_{s,z}$.

16. The apparatus of claim 15, wherein said second engine comprises a non-transitory computer readable storage medium having computer-readable instructions stored thereon, which, when executed, cause said second engine to:
- project a dimensionless unit vector of a direction of a representative velocity vector of said user-defined velocity field on said x-axis, y-axis, and z-axis to produce fractions $\alpha_j$, $\beta_j$, $\gamma_j$, where j is an index of an octant, bounded by said mutually orthogonal axes, in which said representative velocity is located; and
- determine said velocity perturbation as a function of said fractions $\alpha_j$, $\beta_j$, $\gamma_j$, and said incremental velocity vectors $v^+_{s.x}$, $v^+_{s.y}$, $v^+_{s.z}$, $v^-_{s.x}$, $v^-_{s.y}$, and $v^-_{s.z}$.

17. The apparatus of claim 13, wherein said first module comprises a non-transitory computer readable storage medium having computer-readable instructions stored thereon, which, when executed, cause said first module to:
- acquire reference characterizing parameters of each of said reference objects from said repository of descriptors of reference objects;
- determine current characterizing parameters of a user-defined object according to predefined descriptors;
- determine a proximity metric of said current characterizing parameters to said reference characterizing parameters; and
- present a reference object, from among said plurality of reference objects, having minimum proximity metric to said second engine.

* * * * *